(12) United States Patent
Kesler

(10) Patent No.: US 12,345,447 B2
(45) Date of Patent: *Jul. 1, 2025

(54) METHOD OF DETERMINING AND RESPONDING TO AN OVERCAST SKY CONDITION IN A SOLAR TRACKER INSTALLATION

(71) Applicant: OMCO SOLAR, LLC, Phoenix, AZ (US)

(72) Inventor: Matt Kesler, Phoenix, AZ (US)

(73) Assignee: OMCO SOLAR, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,665

(22) Filed: Jun. 28, 2024

(65) Prior Publication Data

US 2024/0353151 A1  Oct. 24, 2024

Related U.S. Application Data

(63) Continuation of application No. 17/877,398, filed on Jul. 29, 2022, now Pat. No. 12,025,349, which is a continuation-in-part of application No. 17/746,322, filed on May 17, 2022, now Pat. No. 11,955,925.

(51) Int. Cl.
*F24S 50/20* (2018.01)
*H02S 20/32* (2014.01)
*H02S 40/20* (2014.01)

(52) U.S. Cl.
CPC .............. *F24S 50/20* (2018.05); *H02S 20/32* (2014.12); *H02S 40/20* (2014.12)

(58) Field of Classification Search
CPC ......... F24S 50/20; F24S 30/425; H02S 20/32; H02S 40/20; Y02E 10/47; Y02E 10/50
See application file for complete search history.

(56) References Cited

U.S. PATENT DOCUMENTS

| | | |
|---|---|---|
| 7,884,308 B1 | 2/2011 | Mejita |
| 8,369,999 B2 | 2/2013 | Beck |
| 8,939,648 B2 | 1/2015 | Schneider et al. |
| 9,281,778 B2 | 3/2016 | Corio et al. |
| 9,806,669 B2 | 10/2017 | De Welle |
| 10,415,974 B2 | 9/2019 | Judkins |
| 10,541,644 B2 | 1/2020 | Arliaud et al. |
| 10,557,646 B1 | 2/2020 | Ma et al. |

(Continued)

*Primary Examiner* — Seung C Sohn

(57) ABSTRACT

A method of determining and responding to an overcast sky condition during daylight hours in a solar tracker installation utilizing a single, fixed-position irradiance sensor associated with a set of solar tracker assemblies of the solar tracker installation and, if a series of irradiance levels communicated by the irradiance sensor to an array controller of a solar tracker control system of the installation indicates that an overcast sky condition has been present for a predetermined overcast sky duration period, the array controller transmitting control signals to a set of solar tracker controllers associated with the set of solar tracker assemblies to deviate from a normal solar tracking mode to an overcast sky mode by pivoting respective tables of the associated set of solar tracker assemblies to one or more predetermined overcast sky condition angles of inclination, and a solar tracker control system for implementing the foregoing method.

9 Claims, 8 Drawing Sheets

(56) References Cited

U.S. PATENT DOCUMENTS

| | | |
|---|---|---|
| 10,917,037 B2 | 2/2021 | Remy et al. |
| 10,944,354 B2 | 3/2021 | Ballentine et al. |
| 11,048,278 B2 | 6/2021 | Lee |
| 11,271,518 B2 | 3/2022 | Ballentine et al. |
| 11,300,979 B2 | 4/2022 | Kesler et al. |
| 11,703,887 B2 | 7/2023 | Morse et al. |
| 11,955,925 B2 | 4/2024 | Kesler et al. |
| 12,025,349 B2 * | 7/2024 | Kesler .................... H02S 20/32 |
| 2007/0277868 A1 | 12/2007 | Huang et al. |
| 2019/0204405 A1 | 7/2019 | Arliaud et al. |
| 2020/0309893 A1 | 10/2020 | Arliaud et al. |
| 2021/0141047 A1 | 5/2021 | Ma et al. |

\* cited by examiner

METHOD OF DETERMINING AND RESPONDING TO AN OVERCAST SKY CONDITION IN A SOLAR TRACKER INSTALLATION

CROSS-REFERENCE TO RELATED APPLICATIONS

The present application is a continuation application under 35 USC 120 of U.S. non-provisional patent application Ser. No. 17/877,398, filed Jul. 29, 2022, issuing as U.S. Pat. No. 12,025,349 on Jul. 2, 2024, entitled METHOD OF DETERMINING AND RESPONDING TO AN OVERCAST SKY CONDITION IN A SOLAR TRACKER INSTALLATION, which is a continuation-in-part of U.S. non-provisional patent application Ser. No. 17/746,322, filed May 17, 2022, issued as U.S. Pat. No. 11,955,926 on Apr. 9, 2024, entitled LARGE-SCALE SOLAR TRACKER INSTALLATION CONTROL SYSTEM. The present continuation application claims priority to both the above-identified U.S. non-provisional patents application Ser. Nos. 17/877,398 and 17/746,322, both of which are incorporated by reference herein in their respective entireties for any and all purposes.

TECHNICAL FIELD

The present disclosure relates to a method of determining and responding to an overcast sky condition during daylight hours in a solar tracker installation and, more specifically, to a method of determining and responding to an overcast sky condition during daylight hours in a solar tracker installation utilizing a single, fixed irradiance sensor associated with a set of solar tracker assemblies of the solar tracker installation and, if an irradiance level determined by the irradiance sensor indicates that an overcast sky condition is present, for each of the solar tracker assemblies of the set of solar tracker assemblies, deviating from a normal sun tracking or solar tracking mode to an overcast sky condition mode and moving or pivoting respective tables of the associated set of solar tracker assemblies to one or more predetermined overcast condition angles of inclination and an apparatus, such as a solar tracker control system, for implementing the method.

BACKGROUND

Large-scale solar tracker installations, sometimes referred to as "utility scale" solar tracker installations, may include several hundred up to several thousand horizontal, single axis solar tracker assemblies distributed across a geographic site or location. The installation site or location may be 100 acres or more in area. Each solar tracker assembly of a solar tracker installation includes a pivoting or rotatable table which is driven by a drive mechanism such that the solar tracker assembly table is rotated or pivoted through a predetermined angle of inclination range (AIR) to track the position of the sun as the sun moves across the sky from east to west.

The table of each solar tracker assembly includes a torque tube beam, which may be several hundreds of feet in length and is generally oriented in a north-south direction. The torque tube beam may be comprised of a plurality of torque tube beam segments of predetermined length, i.e., 40-foot segments. For example, a first portion of the torque tube beam is coupled to one side of a rotating member of the drive mechanism while a second portion of the torque tube beam is coupled to an opposite side of the drive mechanism rotating member. The first portion of the torque tube beam may extend north from the drive mechanism and may be comprised of five, 40-foot torque tube beam segments, while the second portion of the torque tube beam may extend south from the drive mechanism and may similarly be comprised of five, 40-foot torque tube beam segments, thus providing a total north-south extent or length of the torque tube beam of 400 feet.

For a given solar tracker assembly, the torque tube beam supports a plurality of photovoltaic modules which are affixed along a longitudinal extent of the torque tube beam via a frame including a plurality of mounting brackets. The torque tube beam, in turn, is rotatably supported by a plurality of rotatable bearing assemblies of bearing apparatus positioned at spaced apart locations along the torque tube beam. The bearing apparatuses and the drive mechanism are affixed to spaced apart support posts along a length of the torque tube beam. The toque tube beam is generally horizontal, that is, the torque tube beam extends generally parallel to the ground or substrate in which the support posts are mounted, that is, the torque tube beam and, therefore, the solar tracker assembly table generally follows the contour of the land along and over which the torque tube extends.

The modules of the plurality of photovoltaic modules are typically spaced uniformly along the torque tube beam by mounting brackets associated with the frame. Each solar tracker assembly includes the pivoting table which is pivoted about an axis of rotation by the drive mechanism. The table includes everything that pivots or swings about an axis of rotation of the table. The table of a solar tracking system or assembly typically includes: a) the torque tube beam including a plurality of torque tube beam segments; b) the plurality of photovoltaic modules; c) the rotatable bearing assemblies of a plurality of the bearing apparatuses that support the torque tube beam along its length and pivot the torque tube beam about the axis of rotation of the table; and d) the frame which affixes or secures the plurality of photovoltaic modules to the torque tube beam. As noted above, the frame typically includes a number of mounting brackets for mounting the plurality of photovoltaic modules to the torque tube beam.

Associated with each solar tracker assembly is a solar tracker controller. The solar tracker controller is operatively connected to the drive mechanism of the solar tracker assembly to move or pivot the table about the table axis of rotation within the angle of inclination range (AIR) of the table. During daylight hours, when operating in a normal tracking mode, the solar tracker controller periodically changes the table angle of inclination such that the light receiving surfaces of the plurality of photovoltaic modules are generally orthogonal to the position of the sun, within the limits of the angle of inclination range of the table of the solar tracking assembly, to track the sun as is moves across the sky. For example, when the sun is at its apex (solar noon), the table would be pivoted such that the plurality of photovoltaic panels would typically be in a horizontal or neutral position for maximum sun exposure. This would correspond to a neutral position or zero angle of inclination of the table, AI=0 degrees. Typically, the solar tracker controller is physically located in proximity to the drive mechanism of the solar tracker assembly. Tracking of the sun's position during daylight hours is sometimes referred to as a normal tracking mode. During non-daylight hours, tracking of the sun's position is not possible, thus, the solar tracker controller will typically move or pivot the table to a night stow position.

A solar tracker installation typically includes a number of weather sensors that periodically monitor weather conditions present at the solar tracker installation site. Adverse weather conditions, for example, high wind conditions, make it desirable for the solar tracker controller to deviate from the normal tracking mode during daylight hours to protect the plurality of photovoltaic modules and other components of a solar tracker assembly from potential wind damage. Another condition that may cause deviation from the normal tracking mode during daylight hours would be an overcast sky condition. When the sky is overcast, the solar energy available to the plurality of photovoltaic modules of a solar tracker assembly may be reduced by up to 90%. Under an overcast sky condition, the available sunlight tends to be diffuse, from horizon to horizon, as opposed to being mostly direct normal insolation (DNI).

What is needed is a method of determining an overcast sky condition during daylight hours in a solar tracker installation and, for those solar tracker assemblies effected by the overcast sky condition, deviating from the normal tracking mode during a duration of the overcast sky condition and, when the overcast sky condition has ended, returning those solar tracker assemblies to the normal tracking mode, and an apparatus for implementing the method.

SUMMARY

In one aspect, the present disclosure relates to a solar tracker control system for a solar tracker installation located on an installation site, the solar tracker installation including a first set of solar tracker assemblies associated with a first irradiance sensor, each of the first set of solar tracker assemblies including a table supporting a plurality of photovoltaic modules, the table being rotatable through an angle of inclination range, and a drive mechanism coupled to the table for changing a table angle of inclination, the solar tracker control system comprising: a) a first set of solar tracker controllers, each solar tracker controller of the first set of solar tracker controllers associated with a respective different one of the first set of solar tracker assemblies, each solar tracker controller of the plurality of solar tracker controllers including an actuator for changing the table angle of inclination of the associated solar tracker assembly by actuating the drive mechanism of the associated solar tracker assembly; b) an irradiance sensor periodically transmitting irradiance level data relating to the solar tracker installation, the irradiance sensor associated with the first set of solar tracker assemblies; c) an array controller in communications with: 1) each solar tracker controller of the plurality of solar tracker controllers; and 2) the irradiance sensor; d) the irradiance sensor periodically transmitting irradiance level data to the array controller; and e) the array controller analyzing the irradiance level data transmitted by the irradiance sensor and, if the first set of solar tracker assemblies are in a normal solar tracking mode and further if a series of irradiance level values transmitted are below a threshold overcast irradiance level value for a predetermined overcast sky duration period, the array controller transmitting control signals to each of the first set of solar tracker controllers to change from the normal solar tracking mode to an overcast sky mode by pivoting respective tables of the first set of solar tracker assemblies to one or more predetermined overcast sky condition table angles of inclination.

In another aspect, the present disclosure relates to a solar tracker control system for a solar tracker installation located on an installation site, the solar tracker installation including a first set of solar tracker assemblies associated with a first irradiance sensor, each of the first set of solar tracker assemblies including a table supporting a plurality of photovoltaic modules, the table being rotatable through an angle of inclination range, and a drive mechanism coupled to the table for changing a table angle of inclination, the solar tracker control system comprising: a) a first set of solar tracker controllers, each solar tracker controller of the first set of solar tracker controllers associated with a respective different one of the first set of solar tracker assemblies, each solar tracker controller of the plurality of solar tracker controllers including an actuator for changing the table angle of inclination of the associated solar tracker assembly by actuating the drive mechanism of the associated solar tracker assembly; b) an irradiance sensor periodically transmitting irradiance level data relating to the solar tracker installation, the irradiance sensor associated with the first set of solar tracker assemblies; c) an array controller in communications with: 1) each solar tracker controller of the plurality of solar tracker controllers; and 2) the irradiance sensor; d) the irradiance sensor periodically transmitting irradiance level data to the array controller; and e) the array controller analyzing the irradiance level data transmitted by the irradiance sensor and, if the first set of solar tracker assemblies are in an overcast sky mode and further if a series of irradiance level values are above a threshold bright sky irradiance level value for a predetermined bright sky duration period, the array controller transmitting control signals to each of the first set of solar tracker controllers to change from the overcast sky mode to a normal solar tracking mode by pivoting respective tables of the first set of solar tracker assemblies to track sun position.

In another aspect, the present disclosure relates to a method of determining and responding to an overcast sky condition during daylight hours in a solar tracker installation, the solar tracker installation located on an installation site and including a first set of solar tracker assemblies, each of the first set of solar tracker assemblies including a table supporting a plurality of photovoltaic modules, the table being rotatable through an angle of inclination range, and a drive mechanism coupled to the table for changing a table angle of inclination and a first set of solar tracker controllers, each solar tracker controller associated with a respective different one of the first set of solar tracker assemblies, each solar tracker controller of the first set of solar tracker controllers including an actuator for changing the table angle of inclination of the associated solar tracker assembly by actuating the drive mechanism of the associated solar tracker assembly of the first set of solar tracker assemblies, the steps of the method comprising: a) providing an irradiance sensor associated with the first set of solar tracker assemblies, the irradiance sensor periodically transmitting irradiance level data; b) providing an array controller in communications with: 1) each solar tracker controller of the plurality of solar tracker controllers; and 2) the irradiance sensor; c) the irradiance sensor periodically transmitting irradiance level data to the array controller; and d) the array controller analyzing the irradiance level data transmitted by the irradiance sensor and, if the first set of solar tracker assemblies are in a normal solar tracking mode and further if a series of irradiance level values transmitted are below a threshold overcast irradiance level value for a predetermined overcast sky duration period, the array controller transmitting control signals to each of the first set of solar tracker controllers to change from the normal solar tracking mode to an overcast sky mode by pivoting respective tables of the first set of solar tracker assemblies to one or more predetermined overcast sky condition angles of inclination. In another aspect, the present disclosure relates to a method of determining and responding to an overcast sky condition during daylight hours in a solar tracker installation, the solar tracker installation located on an installation site and including a first set of solar tracker assemblies, each of the first set of solar tracker assemblies including a table supporting a plurality of photovoltaic modules, the table being rotatable through an angle of inclination range, and a drive mechanism coupled to the table for changing a table angle of inclination and a first set of solar tracker controllers, each solar tracker controller associated with a respective different one of the first set of solar tracker assemblies, each solar tracker controller of the first set of solar tracker controllers including an actuator for changing the table angle of inclination of the associated solar tracker assembly by actuating the drive mechanism of the associated solar tracker assembly of the first set of solar tracker assemblies, the steps of the method comprising: a) providing an irradiance sensor associated with the first set of solar tracker assemblies; b) providing an array controller in communications with: 1) each solar tracker controller of the plurality of solar tracker controllers; and 2) the irradiance sensor; c) the irradiance sensor periodically transmitting irradiance level data to the array controller; and d) the array controller analyzing the irradiance level data transmitted by the irradiance sensor and, if the first set of solar tracker assemblies are in an overcast sky mode and further if a series of irradiance level values are above a threshold bright sky irradiance level value for a predetermined bright sky duration period, the array controller transmitting control signals to each of the first set of solar tracker controllers to change from the overcast sky mode to a normal solar tracking mode by pivoting respective tables of the first set of solar tracker assemblies to track sun position.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

DETAILED DESCRIPTION

Figure 1:
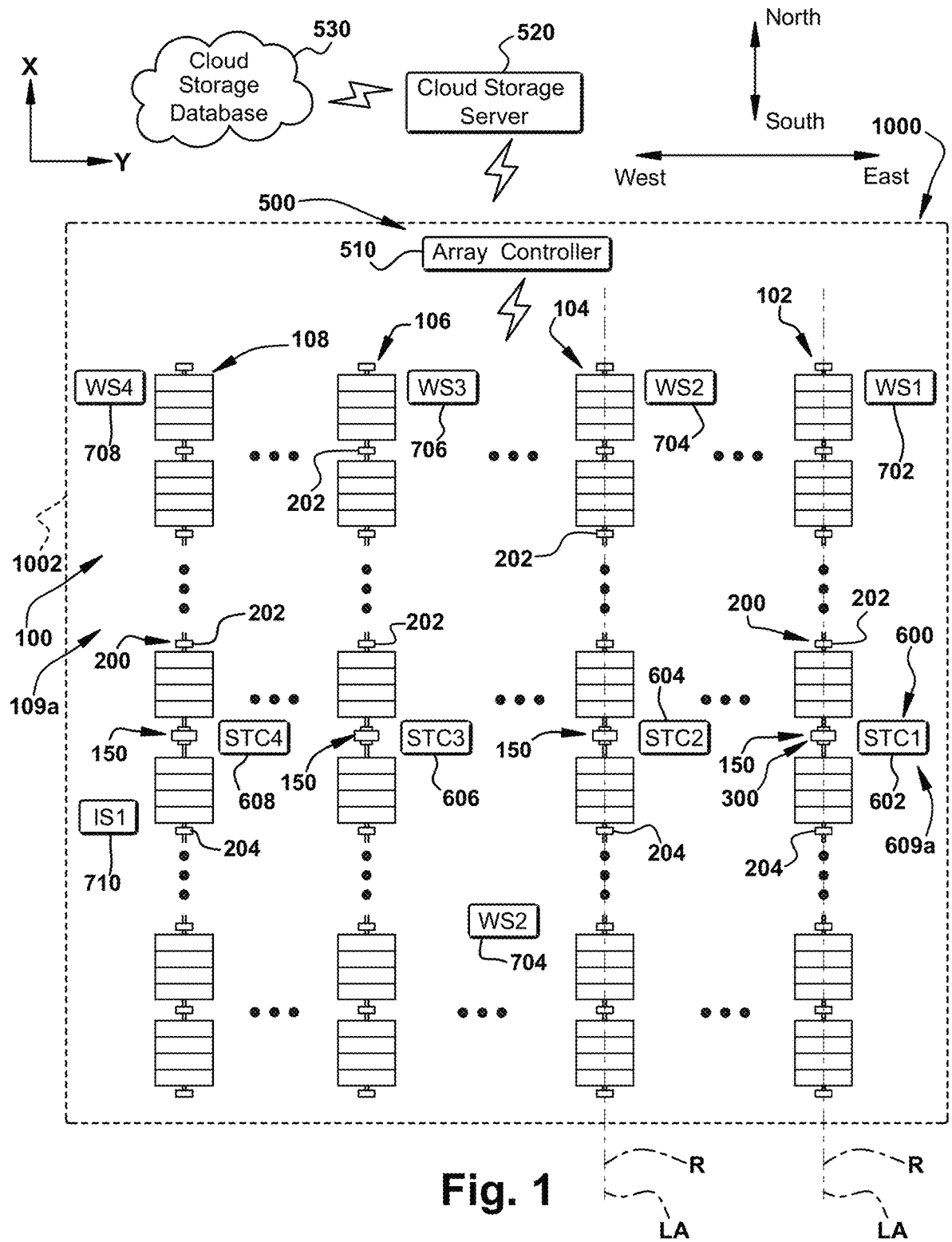
FIG. 1 is a schematic top perspective view of a solar tracker installation including a plurality of horizontal, single axis solar tracker assemblies and a plurality of weather sensors located on an installation site, the solar tracker installation including one or more sets of solar tracker assemblies, each set of solar tracker assemblies including adjacent, aligned rows of spaced apart solar tracker assemblies of the plurality of solar tracker assemblies, each solar tracker assembly of the plurality of solar tracker assemblies including a drive mechanism and a pivoting table, the table including a torque tube beam including a plurality of torque tube beam segments, a plurality of photovoltaic modules; a frame for supporting the plurality of photovoltaic modules, and a plurality of bearing apparatus for rotatably supporting the torque tube beam, each of the solar tracker assemblies operating under the control of an associated solar tracker controller that controls the drive mechanism that pivots the table through an angle of inclination range so that the plurality of photovoltaic modules track the sun as the sun moves across the sky, the solar tracker installation including a control and communications system including an array controller in wireless communication with each of the solar tracker controllers and each of the weather sensors, the control and communications system for data communications, data storage, and operational control of the respective solar tracker controllers of the plurality of solar tracker assemblies of the solar tracker installation, the plurality of weather sensors including a first solar irradiance sensor in geographical proximity to and associated with the first set of solar tracker assemblies for determining overcast sky conditions for the first set of solar tracker assemblies on the solar tracker installation site.

In one exemplary or example embodiment, the present disclosure relates to a method of determining and responding to an overcast sky condition during daylight hours in a solar tracker installation 1000 located on an installation site 1002 utilizing a single, fixed position solar irradiance sensor 710 associated with a first set of solar tracker assemblies 109*a* of the solar tracker installation 1000. The method of determining and responding to an overcast sky condition 2000 of the present disclosure (alternately referred to herein as "overcast sky condition method" or "overcast condition method" or "method") is, in one exemplary embodiment, advantageously implemented or executed by an array controller 510 of a control and communications system 500 of the solar tracker installation 1000, although it should be recognized that the overcast condition method 2000 could be executed by one or more solar tracker installation components having a microprocessor or microcontroller to execute the calculations of the method 2000 and issue appropriate control signals to the appropriate solar tracker controllers of a plurality of solar tracker controllers 600. For example, a first set of solar tracker controllers 609a associated with the first set of solar tracker assemblies 109a could be utilized to implement the overcast condition method 2000. Essentially, given an irradiance level IL, as measured by the solar irradiance sensor 710, representing a current condition of the sky (overcast sky condition vs. bright sun/bright sky condition) at the installation site 1002, the method 2000 switches between a normal solar tracking mode 1100 (also referred to herein as normal sun tracking mode or normal tracking mode), wherein respective tables 110 of the first set of solar tracker assemblies 109a are pivoted or moved by associated solar tracker controllers of a first set of solar tracker controllers 609a to track the sun as the sun moves across the sky, and an overcast sky mode 1200 (also referred to herein as overcast sky condition mode or overcast condition mode), wherein the respective tables 110 of the first set of solar tracker assemblies 109a are pivoted or moved by associated solar tracker controllers of a first set of solar tracker controllers 609a to one or more predetermined angle of inclination positions, e.g., angle of inclination positions AI1, AI2. The method 2000 uses decision rules to determine under what conditions a change of mode will be made from the normal tracking mode 1100 to the overcast sky mode 1200 and vice versa.

In one exemplary or example embodiment of the overcast condition method 2000, the array controller 510 periodically receives a transmission or input from the irradiance sensor 710 of an irradiance level IL, indicative of the intensity of solar radiation striking an upper light receiving surface 755 of a sensor body 750 of the irradiance sensor 710 at a present time t. The irradiance level value IL may be an instantaneous intensity value or an average intensity value over a predetermined time period. In a first decision rule of the method 2000, if the irradiance level or irradiance level value IL output by the irradiance sensor 710 is above a predetermined bright sky irradiance level ILT1, the array controller 510 determines that a bright sun or non-overcast sky condition is present. If the first set of solar tracker assemblies 109a are already in the normal tracking mode 1100, the array controller 510 maintains the first set of solar tracker assemblies 109a in the normal tracking mode 1100. However, if the first set of solar tracker assemblies 109a are in the overcast sky mode 1200, to avoid hypersensitivity, that is, undesirable switching between the overcast sky mode 1200 and the normal tracking mode 1100, a first time duration requirement, that is, a first predetermined bright sky condition time period or bright sky duration period TD1 for the bright sun sky condition must be met before the array controller 510 transmits control signals to the first set of solar tracker controllers 609a to move or pivot the angle of inclination of the tables 110 associated with the first set of solar tracker assemblies 109a from the overcast sky mode 1200 to the normal tracking mode 1100. Similarly, in a second decision rule of the method 2000, if the irradiance level IL output by the irradiance sensor 710 is below a predetermined threshold overcast sky irradiance level ILT2, the array controller 510 determines that an overcast sky condition is present. If the first set of solar tracker assemblies 109a are already in the overcast sky mode 1200, the array controller 510 maintains the first set of solar tracker assemblies 109a in the overcast sky mode 1200. However, if the first set of solar tracker assemblies 109a are in the normal tracking mode 1100, to avoid hypersensitivity, that is, undesirable switching between the normal tracking mode 1100 and the overcast sky mode 1200, a second time duration requirement, that is, a second predetermined overcast sky time period or overcast sky duration period TD2, for the overcast sky condition must be met before the array controller 510 transmits control signals to the first set of solar tracker controllers 609a to switch the angle of inclination of the tables associated with the first set of solar tracker assemblies 109a from the normal tracking mode 1100 to the overcast sky mode 1200.

In one exemplary or example embodiment of the method 2000, when the first set of solar tracker assemblies 109a are either switched to or are in the overcast sky mode 1200, the method 2000 provides the following decision rule, namely: a) if the present time t is prior to solar noon (i.e., a solar AM time period), the array controller 510 communicates control signals to the first set of solar tracker controllers 609a to move or pivot respective tables 110 of the associated set of solar tracker assemblies 109a to a first, predetermined AM overcast condition angle of inclination AI=AI1 and, if the time is solar noon or later (a solar PM time period), the array controller 510 communicates control signals to the first set of solar tracker controllers 609a to move or pivot the respective tables 110 of the associated set of solar tracker assemblies 109a to a second, predetermined PM overcast condition angle of inclination AI=AI2. A solar AM time period is a daylight hour time period extending from sunrise until "solar noon", that is, the time at which the sun is at its peak or apex in the sky, while a solar PM time period is a daylight hour time period extending from "solar noon" to sunset. In one example embodiment, during the solar AM time period, operation of the set of solar tracker assemblies 109a under the overcast sky mode 1200 would result in the angle of inclination AI of the tables 110 of the first set of solar tracker assemblies 109a set to AI=AI1=−5 degrees facing eastward. While during the solar PM time period, operation of the set of solar tracker assemblies 109a under the overcast sky mode 1200 would result in the angle of inclination AI of the tables 110 of the first set of solar tracker assemblies 109a set to AI=A12=+ 5 degrees facing westward.

When an overcast sky condition affects a set of solar tracker assemblies 109a of a solar tracker installation 1000, each solar tracker assembly of the set of solar tracker assemblies 109a would accordingly experience a commensurate reduced energy output. If the normal tracking mode 1100 is continued during the overcast sky condition each of the solar tracker assemblies of the set of solar tracker assemblies 109a would produce less energy because the plurality of photovoltaic modules 190 of each solar tracker assemblies, for example, the representative solar tracker assembly 102, in the set of solar tracker assemblies 190a would be pointed to or be normal to the present position of the sun. Accordingly, if operated in the normal tracking mode 1100, unless the sun's position was at solar noon (at the apex of the sun's position in the sky), the table angle of inclination AI of the solar tracker assembly 102 would not be a neutral or angle of inclination AI=0 degrees and the plurality of photovoltaic modules 190 of the solar tracker assembly 102 would not "see" the entire sky. Operating the solar tracker assembly 102 so that the plurality of photovoltaic modules 190 face the sun results in the production of less energy by the modules 190. Under overcast sky conditions, as opposed to a passing cloud which is not an overcast sky condition, direct normal insolation (DNI) is dramatically reduced, while the diffuse component of irradiance remains somewhat high. So the benefits of the normal tracking mode 1100 are reduced during an overcast sky condition.

Figure 2:
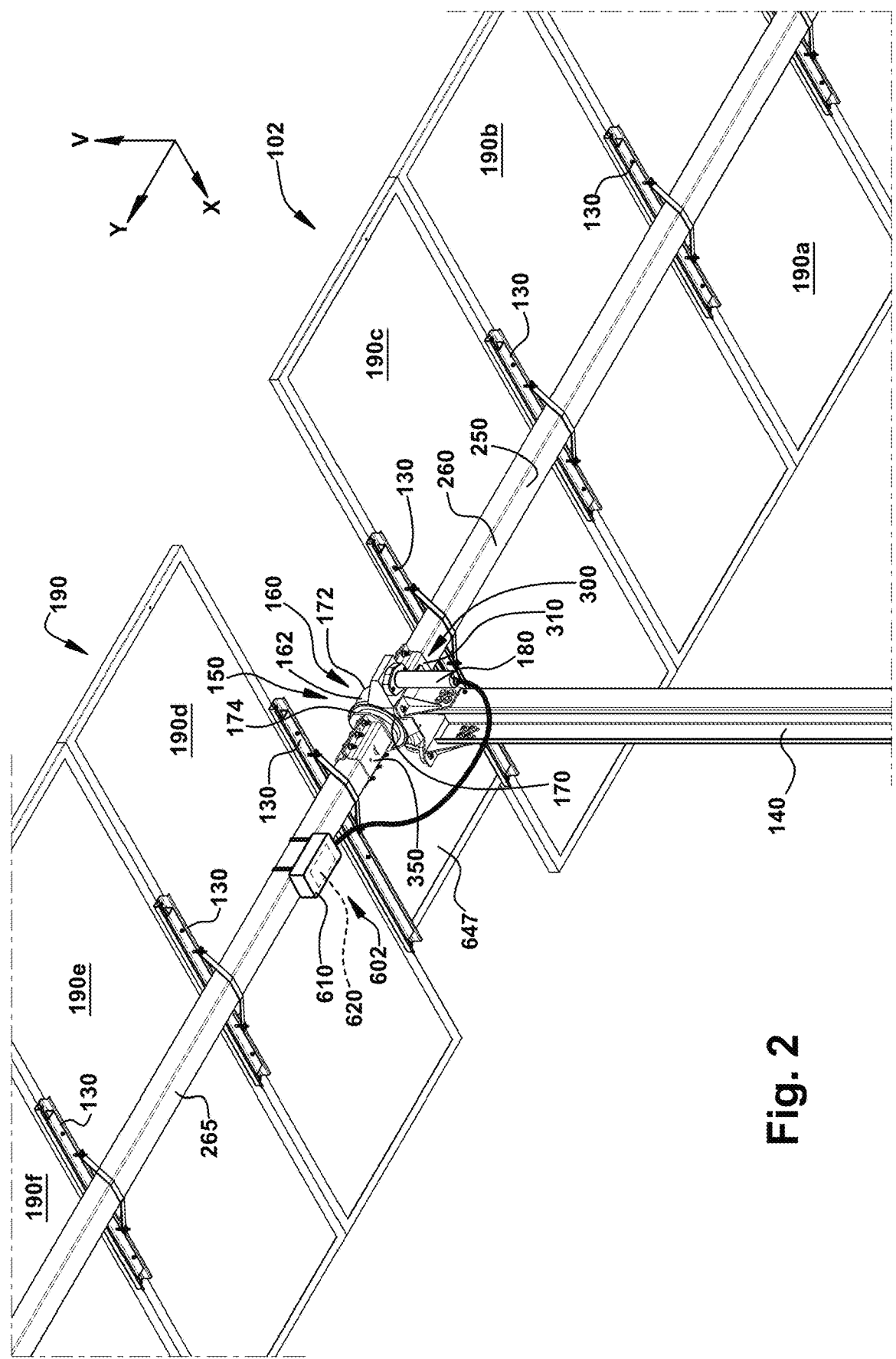
FIG. 2 is a schematic bottom perspective view of a portion of a representative solar tracker assembly of the plurality of solar tracker assemblies of the solar tracker installation of FIG. 1, including a solar tracker controller associated with the solar tracker assembly operatively coupled to a drive mechanism of the solar tracker assembly, the solar tracker controller operating via the drive mechanism to change an angle of inclination of the solar tracker, the solar tracker controller including a dedicated photovoltaic module for providing power to the solar tracker controller.

Additionally, in one exemplary embodiment, the drive mechanism 150 of the solar tracker assembly 102 includes a DC drive motor 180 which drives a slew drive 160. The corresponding solar tracker controller 602 includes a housing 610 containing controller electronics 620 (schematically depicted in dashed line in FIG. 2). In one example or exemplary embodiment, the controller electronics 620 of the solar tracker controller 602 are powered by a dedicated photovoltaic module 647 mounted to and pivoting with the torque tube beam 250 and specifically, as schematically depicted in FIG. 2, mounted to and pivoting with torque tube beam segment 265. The controller electronics 620 includes a DC battery which stores DC power generated by the dedicated photovoltaic module 647. The DC battery powers an actuator/motor driver of the controller 602 which, in turn, drives the DC drive motor 180 of the drive mechanism 150 of the solar tracker assembly 102 to move or pivot the table 110 of the solar tracker assembly 102, as desired, through its angle of inclination range AIR. Operating the solar tracker assembly 102 in normal tracking mode 1100 under an overcast sky condition will undesirably drain the DC battery of the solar tracker controller 602 and may result in a low charge condition for the DC battery, forcing the solar tracker controller 602 to change to a low battery mode in which the controller 602 moves or pivots the table 110 to a shallow angle of inclination to avoid the possibility that the table 110 will be "stuck" at or near a maximum negative or positive angle of inclination AI−, AI+ if the DC battery discharges to a non-functioning level. It is undesirable for the table 110 to be 'stuck" at or near a maximum negative or positive angle of inclination AI−, AI+ due to potential damage from, for example, a high wind condition.

Of course, it should be appreciated that even if each of the first set of solar tracker controllers 609a utilize an AC actuator/motor driver to drive the respective DC drive motors 180 of the drive mechanisms 150 of the first set of solar tracker assemblies 109a or if the drive mechanism 150 included an AC drive motor, as opposed to the DC drive motor 180, utilizing the overcast sky condition method 2000 of the present disclosure during an overcast sky condition remains advantageous because the production of solar energy output from the first set of solar tracker assemblies 109a when the table angles of inclination are set in accordance with the overcast sky mode 1200 will be greater than if the table angles of inclination of the first set of solar tracker assemblies 109a were set in accordance with the normal tracking mode 1100. This is true given the reduction of direct normal insolation (DNI) under overcast sky conditions, while the diffuse component of irradiance remains somewhat high under overcast sky conditions. If the first set of solar tracker assemblies 109a each include a DC drive motor 180 and if the first set of solar tracker controllers 609a each include a DC actuator/motor driver and DC battery as part of the controller electronics 620, utilizing the overcast condition method 2000 and operating the first set of solar tracker assemblies 109a in accord with the overcast sky mode 1200 of operation during overcast sky conditions will result in the additional benefit of reduced DC battery energy usage for the solar tracker controllers of the first set of solar tracker controllers 609a, as explained previously.

Solar Tracker Installation 1000

As schematically depicted in FIG. 1, the solar tracker installation 1000 is located on the installation site 1002. The installation site 1002 of the solar tracker installation 1000 is schematically depicted as a geographic area within the bounds of a dashed line labeled 1002 in FIGS. 1 and 7, however, it should be understood that the site 1002 could include two or more geographic areas or plots of land that are non-contiguous. The solar tracker installation 1000 includes a plurality of solar tracker assemblies 100, each solar tracker assembly of the plurality of solar tracker assemblies 100 operating under the control of an associated one of a plurality of solar tracker controllers 600. A solar tracker controller, for example, a solar tracker controller 602 associated with a specific solar tracker assembly, for example, a representative solar tracker assembly 102, via a drive mechanism 150 of the solar tracker assembly 102, controls an angle of inclination AI of a table 110 of the solar tracker assembly 102. Each of the plurality of solar tracker assemblies 100, for example, the solar tracker assembly 102, includes a plurality of photovoltaic modules 190 mounted to and supported by a torque tube beam 250. The plurality of photovoltaic modules 190 are affixed to the torque tube beam 250 by a frame 120. The torque tube beam 250, in turn, is supported for rotation or pivoting about an axis of rotation R by a plurality of bearing apparatuses 200 positioned at spaced apart locations along the torque tube beam 250. Each bearing apparatus of the plurality of bearing apparatuses 200 includes a rotatable or rotating bearing assembly 210 supported by a stationary saddle assembly 220. The rotatable bearing assembly 210 includes a torque tube beam slot 212 which receives the torque tube beam 250.

Figure 7:
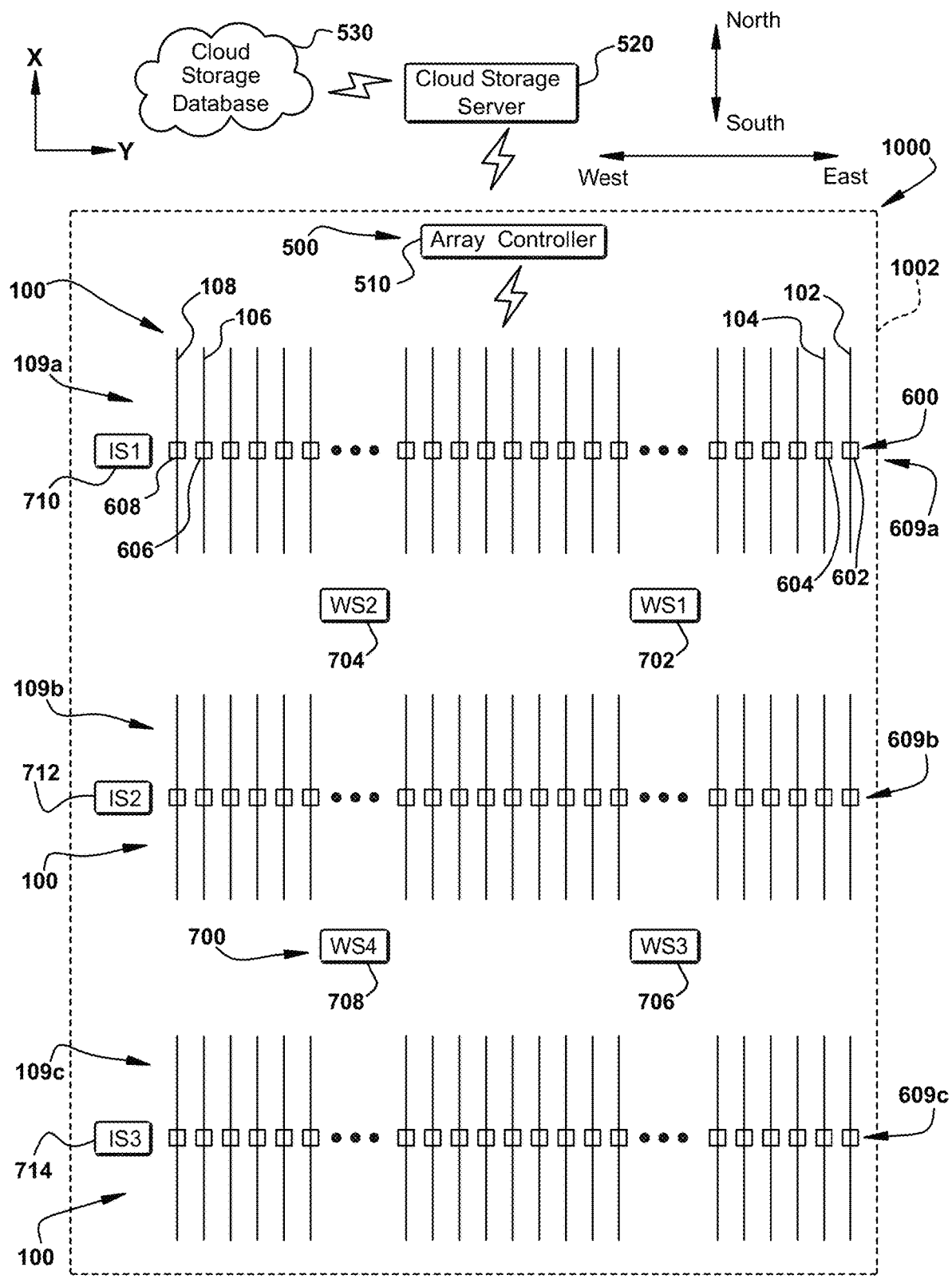
FIG. 7 is a schematic top perspective view of a solar tracker installation including a plurality of horizontal, single axis solar tracker assemblies, associated solar tracker controllers, and a plurality of weather sensors located on an installation site, the solar tracker installation comprising a plurality of solar tracker assembly sets including first, second and third sets of solar tracker assemblies, each set of solar tracker assemblies including adjacent, aligned rows of spaced apart solar tracker assemblies of the plurality of solar tracker assemblies and each set of solar tracker assemblies being associated with a different one of a plurality of solar irradiance sensors located in proximity to the solar tracker assemblies of the associated set of solar tracker assemblies.

In one exemplary or example embodiment, the solar tracker assemblies 100 of the solar tracker installation 1000 are arranged in one or more sets of parallel, aligned, spaced apart solar tracker assemblies on an installation site 1002. For example, FIG. 1 schematically illustrates a single set of solar tracker assemblies, namely, a first set of solar tracker assemblies 109a located on the installation site 1002. It should be understood that other sets of parallel, aligned, spaced apart solar tracker assemblies may be present, depending on the size and configuration of the installation site 1002. This would be particularly true for a large-scale solar installation wherein a geographic size the installation size may be, for example, greater than 100 acres and wherein the plurality of solar tracker assemblies 100 may exceed 1000 assemblies. Such a large-scale solar installation 1000 is schematically depicted in FIG. 7 wherein the solar tracker installation 1000 includes three geographically separated sets of solar tracker assemblies, namely, sets 109a, 109b, 109c, along with corresponding or associated sets of solar tracker controllers 609a, 609b, 609c. For brevity, the discussion herein will focus on the set of solar tracker assemblies 109a, it being understood that the same discussion and analysis would equally apply to all other sets of solar tracker assemblies of the solar tracker installation 1000. As schematically depicted in FIG. 1, the first set of solar tracker assemblies 109a includes from east to west, rows of solar tracker assemblies 102, 104, 106, 108 (recognizing, of course, that in an actual solar tracker installation, the number of rows of solar tracker assemblies, that is, the number of aligned, parallel, spaced-apart solar tracker assemblies comprising the first set 109a would include more than four rows of solar tracker assemblies and, depending on the size of the installation site 1002, could include up to a hundred or more spaced-apart, parallel, aligned solar tracker assemblies comprising the first set of solar tracker assemblies 109a). The presence of additional solar tracker assemblies between solar tracker assembly 104 and solar tracker assembly 106 is represented schematically by the ellipsis or three dots in FIGS. 1 and 7.

Each solar tracker assembly 102, 104, 106, 108 of the first solar tracker assembly set 109a of the solar tracker installation 1000 is oriented such that the pivoting table 150 of the solar tracker assembly, including the longitudinally extending torque tube beam 250 of the table 150, is oriented in a north-south direction such that a plurality of photovoltaic modules 190 supported by a torque tube beam 250 may be pivoted through an angle of inclination range AIR of the table 150 thereby allowing the upper surfaces of the plurality of photovoltaic modules 190 to track the sun as it moves across the sky from east to west when the table angles of inclination are determined in accordance with a normal solar tracking mode 1100. By contrast, in FIG. 7, the solar tracker installation 1000 is schematically depicted as having three sets of solar tracker assemblies 109a, 109b, 109c on the installation site 1002. That is, the plurality of solar tracker assemblies 100 of the solar tracker installation 1000 includes three spaced apart sets of solar tracker assemblies 109a, 109b, 109c distributed over an extent of the installation site 1002.

In one exemplary or example embodiment, the plurality of solar tracker controllers 600 are part of a wireless solar tracker control and communications system 500 (hereinafter also alternately referred to as "solar tracker control system" or "control system") of the solar tracker installation 1000. The control and communications system 500 advantageously employs a long-range, radio frequency, sub GHz, wireless data communications protocol and a star wireless communications network configuration 502 to allow for centralized control of the installation 1000 by a central controller or array controller 510 and provide for efficient, wireless transmission of data and control signals between the array controller 510, the plurality of solar tracker controllers 600, and a plurality of weather sensors 700. The array controller 510 receives wireless communications from the plurality of weather sensors 700 regarding weather-related data and receives wireless communications from the plurality of solar tracker controllers 600 regarding operating and maintenance data of the associated plurality of solar tracker assemblies 100. The array controller 510, in turn, wirelessly communicates control signals to each of the plurality of solar tracker controllers 600, for example, solar tracker controller 602, indicating: a) what operating mode the solar tracker controller 602 should operate its associated solar tracker assembly 102 in; and/or b) what the angle of inclination AI of the table 110 of its associated solar tracker assembly 102 should at. Additionally, the control and communications system 500 additionally includes storage of selected data regarding operation and maintenance of the solar track installation 1000, allowing for remote, real time access to stored operating and maintenance data by owners/operators of the solar tracker installation 1000 via smart devices. In one exemplary embodiment, the array controller 510 stores operating and maintenance data in a cloud storage database 530 utilizing a cloud storage server 520, which may be remote from the installation site 1002. Communications from the array controller 510 to the cloud storage server 520 may be via a router (which is part of electronics of the array controller 510 or via a cellular network. Additional details of the function and configuration of the solar tracker control system 500 are found in the aforementioned U.S. non-provisional patent application Ser. No. 17/746,322, filed May 17, 2022 and assigned to the assignee of the present application. The present application is a continuation-in-part of application Ser. No. 17/746,322. Application Ser. No. 17/746,322 is incorporated by reference it its entirety herein.

In one exemplary embodiment, the operating modes of the first set of solar tracker assembly 109a, operating under the control of the solar tracker controller 602 and the array controller 510, and utilizing the irradiance level measurements IL of the irradiance sensor 710, include the following: a) the normal solar tracking or normal tracking mode 1100, utilized in daylight hours, in which table angle of inclination AI is changed so that the photovoltaic modules 190 track the position of the sun as the sun moves across the sky from east to west to maximize energy output; b) the overcast sky condition or overcast sky mode 1200, utilized in daylight hours and deviating from the normal tracking mode 1100, in the overcast sky mode 1200, the table angle of inclination AI is moved, in one example embodiment, to one of two predetermined positions if an overcast sky condition is determined; c) a backtracking mode 1300, utilized during daylight hours and deviating from the normal tracking mode 1100, the backtracking mode 1300 seeks to mitigate shading of one or more of the plurality of photovoltaic modules of one solar tracker assembly 102, by the plurality of photovoltaic modules of an adjacent solar tracker assembly in a row or set of aligned, spaced-apart solar tracker assemblies, for example, changing the table angle of inclination AI of solar tracker assembly 102 to mitigating potential shading of one or more of the plurality of photovoltaic modules 190 of the solar tracker assembly 104 during early morning hours by the plurality of photovoltaic modules 190 of the eastern most solar tracker assembly 102 that otherwise might occur if the normal tracking mode was used to set the table angle of inclination AI for the solar tracker assembly 102; d) night stow mode 1400, utilized during non-daylight hours, the night stow mode 1400 sets the angle of inclination AI of the plurality of solar tracker assemblies 100 in a predetermined position during non-daylight hours; e) wind stow mode—utilized anytime, the wind stow mode sets the angle of inclination AI of the plurality of solar tracker assemblies 100 to one of two predetermined shallow angle of inclination values, depending on wind direction, for protection of the plurality of photovoltaic modules 190 and other components of the table 100; and f) low battery mode—utilized anytime, as previously explained, if the DC battery of a solar tracker controller of the first set of solar tracker controllers 609a, for example, solar tracker controller 602 has insufficient charge, the angle of inclination AI of the associated solar tracker assembly 102 is moved by the controller 602 to a shallow angle of inclination to avoid the possibility that the table 110 of the solar tracker assembly 102 will be 'stuck" at or near a maximum negative or positive angle of inclination AI−, AI+ if the DC battery discharges to a non-functioning level.

The plurality of weather sensors 700 of the solar tracker installation 1000 will typically include anemometers (wind speed sensors), snow sensors for detection of snow accumulation on the upper surfaces of a plurality of photovoltaic modules 190 of a solar tracker assembly 102. The plurality of wind speed and snow detection weather sensors are schematically depicted as weather sensors 702, 704, 706, 708 in FIGS. 1 and 7. Of course, the actual number and position of the plurality of weather sensors 700 will depend on the geographic size and layout of the installation site 1002. In one exemplary embodiment, the plurality of weather sensors 700 are powered by AC power lines. The weather sensor electronics includes an AC/DC converter to convert the supplied AC power into DC power to power the weather sensor electronics. Utilizing the LoRa wireless communications devices, the weather sensors 700 periodically transmits weather condition data and weather sensor identification data (uniquely identifying the weather sensor) to the array controller 510. The communication of weather condition data and weather sensor identification data from the weather sensors to the array controller 510 in the solar tracker control and communications system 500 of the present disclosure is advantageously direct or point-to-point, RF wireless communications utilizing a LoRa communication devices and a LoRaWAN communications protocol which allow direct, point-to-point wireless communications between nodes (plurality of weather sensors 700, plurality of solar tracker controllers 600 and the array controller 510) in the network 502 at a distance of 1 mile (or more). The communications between the each of the plurality of weather sensors 700 and the array controller 510 can be both in the "up" direction, that is, from the weather sensor to the array controller 510 and the "down" direction, that is, from the array controller 510 to the weather sensor. For example, if a weather sensor of the plurality of weather sensors 700 is transmitting weather condition data that is clearly false or inconsistent, the array controller 510 will transmit control signals to the weather sensor to shut down the weather sensor until appropriate maintenance action can be taken with regard to the weather sensor. In an alternate exemplary embodiment, one or more of the plurality of weather sensors 700 may be powered by DC power, as opposed to running AC power lines to each of the plurality of weather sensors 700. In one exemplary embodiment, each weather sensor would have a dedicated photovoltaic module which would provide DC power charge a DC battery. The DC battery, in turn, would power the weather sensor electronics. The dedicated photovoltaic module may be of a smaller size than the photovoltaic modules of the solar tracker assemblies 100 since the amount of power needed to change the DC battery and maintain proper change for powering weather sensor electronics is relatively small.

Advantageously, the plurality of weather sensors 700 also include the fixed-position sunlight or irradiance sensor 710 that is used in connection with the overcast condition method 2000. In one exemplary embodiment, the irradiance sensor 710, shown schematically in FIG. 5, includes an irradiance sensor assembly 740. The assembly 740 includes a sensor body 750, including a horizontally oriented light receiving surface 755. The assembly 740 also includes sensor electronics 735 disposed in a housing 740. The sensor housing 740 and the sensor body 750 are affixed to a vertically extending support post 760 which is pounded into or otherwise affixed to the ground G. The support post 760 extends vertically along a support post vertical axis SPVA which is substantially orthogonal to the light receiving surface 755 of the sensor body 750. Alternatively, the irradiance sensor 710 could be mounted to a housing of the array monitor 510. In such a configuration, hardwired transmission of irradiance level IL measurements may be sent directly to electronics of the array monitor 510. In one exemplary embodiment, the irradiance sensor is a pyranometer. It should be appreciated that other types of irradiance sensors could be utilized including, for example, an encapsulated solar cell.

In one exemplary or example embodiment, the single, fixed position irradiance sensor 710 is used for determining overcast sky conditions for the entirety of the solar tracker installation 1000. That is, if an overcast condition is determined by the array controller 510, executing the overcast condition method or algorithm 2000, then control signals are communicated to each of the plurality of solar tracker controllers 600 of the installation 1000 to change from the normal tracking mode 1100 to the overcast sky mode 1200 and move or pivot the respective tables 110 of all of the solar tracker assemblies 100 of the installation to the either the AM overcast sky condition angle of inclination AI1 or the PM overcast sky condition angle of inclination AI2. However, if the solar tracker installation 1000 is a large-scale installation and geographic size of the installation site 1002 is large and geographically diverse, it may be desirable to have each set of solar tracker assemblies, namely, solar tracker assembly sets 109a, 109b, 109c of the solar tracker installation 1000, to each have its own irradiance sensor, for example, as schematically depicted in FIG. 7, the first irradiance sensor 710 is associated with the solar tracker assemblies of the first set of solar tracker assemblies 109a of the plurality of solar tracker assemblies 100 of the solar tracker installation 1000, a second irradiance sensor 712 is associated with the solar tracker assemblies of the second set of solar tracker assemblies 109b of the plurality of solar tracker assemblies 100 of the installation 1000, and a third irradiance sensor 714 is associated with the solar tracker assemblies of the third set of solar tracker assemblies 109c of the plurality of solar tracker assemblies 100 of the installation 1000. This may be advantageous if, for example the installation site 1002 is very large or non-contiguous over its entirety. Thus, the overcast condition method 2000 would be calculated for the first set of solar tracker assemblies 109a utilizing irradiance levels IR communicated to the array monitor 510 by the first irradiance sensor 710, the overcast condition method 2000 would be calculated for the second set of solar tracker assemblies 109b utilizing irradiance levels IR communicated to the array monitor 510 by the second irradiance sensor 712, and the overcast condition method 2000 would be calculated for the third set of solar tracker assemblies 109c utilizing irradiance levels IR communicated to the array monitor 510 by the third irradiance sensor 714. Use of multiple irradiance sensors would also be advantageous in the event of a failure of one of the sensors 710, 712, 714. That is, if the first irradiance sensor 710 failed, the overcast condition method 2000 could still be executed by the array controller 510 utilizing the irradiance level IR inputs from the second and/or third irradiance sensors 712, 714.

Solar Tracker Assembly 100 and Solar Tracker Controller 600

For simplicity, when discussing the plurality of solar tracker assemblies 100 of the solar tracker installation 1000, a representative solar tracker assembly, namely, solar tracker assembly 102, will be referenced with the understanding that the description of the solar tracker assembly 102 is applicable to each of the solar tracker assemblies of the plurality of solar tracker assemblies 100. Similarly, when discussing the plurality of solar tracker controllers 600 associated with respective solar tracker assemblies of the plurality of solar tracker assemblies 100, a representative solar tracker controller, namely, solar tracker controller 602, will be referenced with the understanding that the description of the solar tracker controller 602 is applicable to each of the solar tracker controllers of the plurality of solar tracker controllers 600. The solar tracker assembly 102 includes the pivoting table 110 which is pivoted about the axis of rotation R by the drive mechanism or drive actuator 150 of the solar tracker assembly 102. The table 110 includes everything that pivots or swings about the axis of rotation R of the table 110. The table 110 of the solar tracking assembly includes: a) the torque tube beam 250 including a plurality of torque tube beam segments, four torque tube beam segments are schematically depicted in the drawings, namely, torque tube beam segments 265, 270, 275, 280; b) the plurality of photovoltaic modules 190; c) a frame 120 which affixes or secures the plurality of photovoltaic modules 190 to the torque tube beam 250; d) the rotatable bearing assemblies 210 of the plurality of solar tracker bearing apparatuses 200 that support the torque tube beam 250 for pivoting movement such that the table 110 may pivot or rotate about the table axis of rotation R; and e) a pivoting portion of the drive mechanism 150, which is coupled to the torque tube beam 250 via one or more drive journals and rotates or pivots the table about the table axis of rotation R.

In one exemplary embodiment, the solar tracker assembly 102 is a single row, horizontal, single axis solar tracker assembly wherein the table 110 of the solar tracker assembly 102 is rotated or pivoted by the drive mechanism 150 through the angle of inclination range AIR (schematically depicted in FIG. 5) to track movement of the sun across the sky/horizon. The drive mechanism 150 of the solar tracker assembly 102 is controlled by the solar tracker controller 602, which is part of the solar tracker control system 500. In one exemplary embodiment, the drive mechanism 150 of the representative solar tracker assembly 102 comprises a single drive motor 180 operatively coupled to a single slew drive or slew gear drive 160, which pivots the table 110 through the predetermined angle of inclination range AIR. However, one of skill in the art would appreciate that the concepts of the present disclosure are equally applicable to solar tracker systems where multiple slew drives are utilized along an extent of the table to pivot the table 110. In one exemplary embodiment, the drive motor 180 is a DC motor and, more specifically, a DC drive motor. However, it should be recognized that the drive motor 180 may alternatively an AC drive motor. Utilizing an AC drive motor, however, will require routing of AC power lines to the AC drive motors of each of the plurality of solar tracker assemblies 100. However, use of an AC drive motor, is within the scope of the present disclosure. If an AC drive motor is utilized, the actuator 630a of the associated solar tracker controller 602 will be an AC motor driver, as opposed to the DC motor driver 630.

Figure 3:
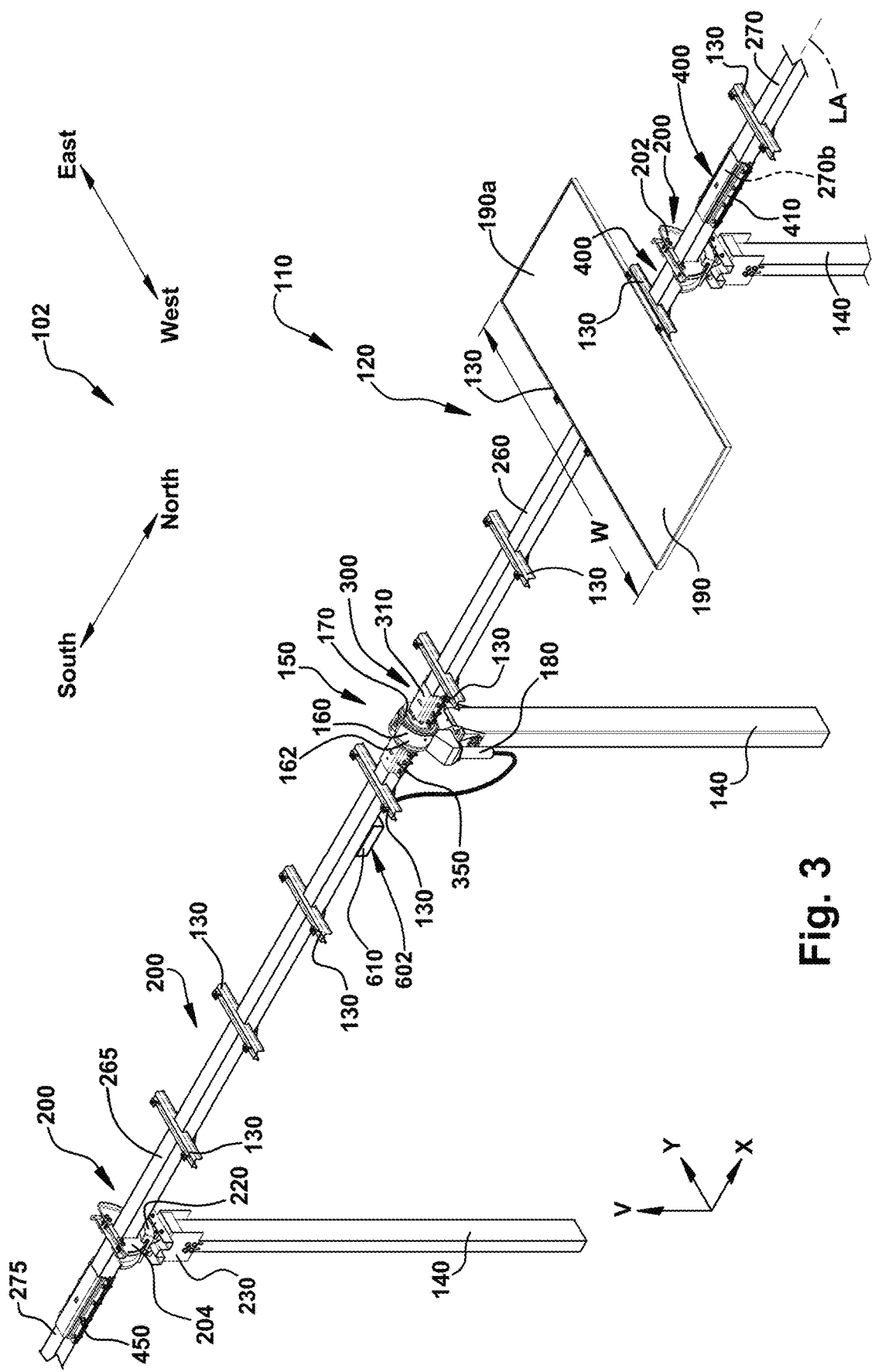
FIG. 3 is a schematic top perspective view of a portion of the representative solar tracker assembly of FIG. 2, with all but one of the plurality of photovoltaic modules and the dedicated photovoltaic modules of the solar tracker controller removed to facilitate viewing of components of the table.
Figure 4:
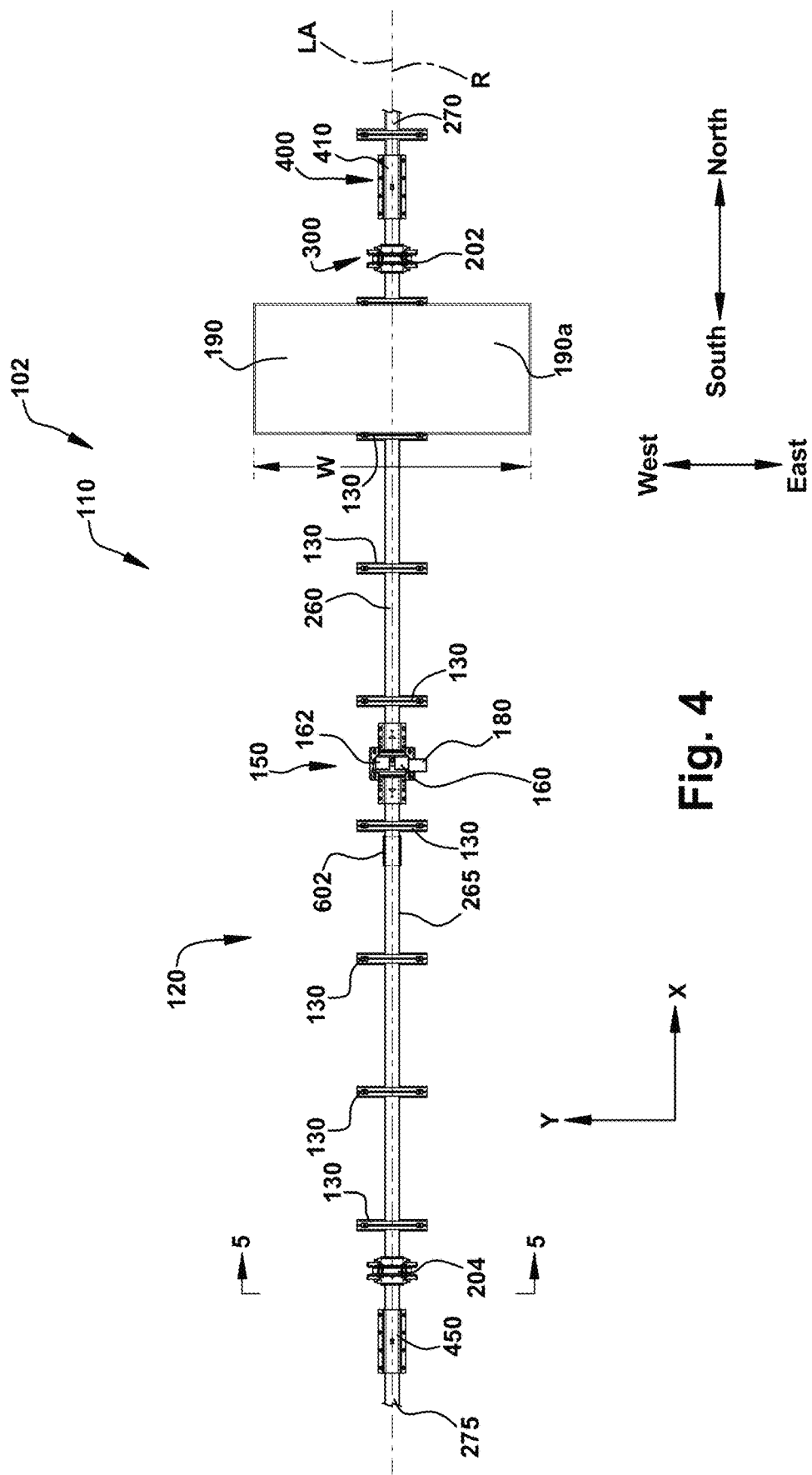
FIG. 4 is a schematic top plan view of the representative solar tracker assembly of FIG. 2.

As best seen in FIGS. 2-5, the representative solar tracker assembly 102 includes the drive mechanism 150 to rotate a table 110 of the solar tracker assembly 100 about a table axis of rotation R through the predetermined angle of inclination range AIR. The table 110 of the solar tracker assembly 102 includes the frame 120 supporting a plurality of photovoltaic modules 190, including, as schematically depicted in FIG. 2, representative photovoltaic modules 190a, 190b, 190c, 190d, 190e, 190f. The rotatable torque tube beam 250 of the table 110, in turn, supports the frame 120. The plurality of bearing apparatuses 200, including representative bearing apparatuses 202, 204, in turn, rotatably support the torque tube beam 250. The torque tube beam 250 is comprised of a plurality of aligned and couple torque tube beam segments. In FIGS. 3 and 4, portions of four torque tube beam segments, namely, first, second, third and fourth torque tube beam segments 260, 265, 270, 275 of the torque tube beam 250 are schematically depicted, it being understood that the solar tracker assembly 100 includes additional torque tube beam segments not shown. The plurality of bearing apparatuses 200 are advantageously configured and positioned such that, other than the first and second torque tube beam segments 260, 265 of the torque tube beam 250 adjacent the drive mechanism 150, the table axis of rotation R, is vertically aligned with, that is, would pass through or be acceptably close, for design purposes, to passing through a center of gravity or center of mass of the table 110.

Figure 5:
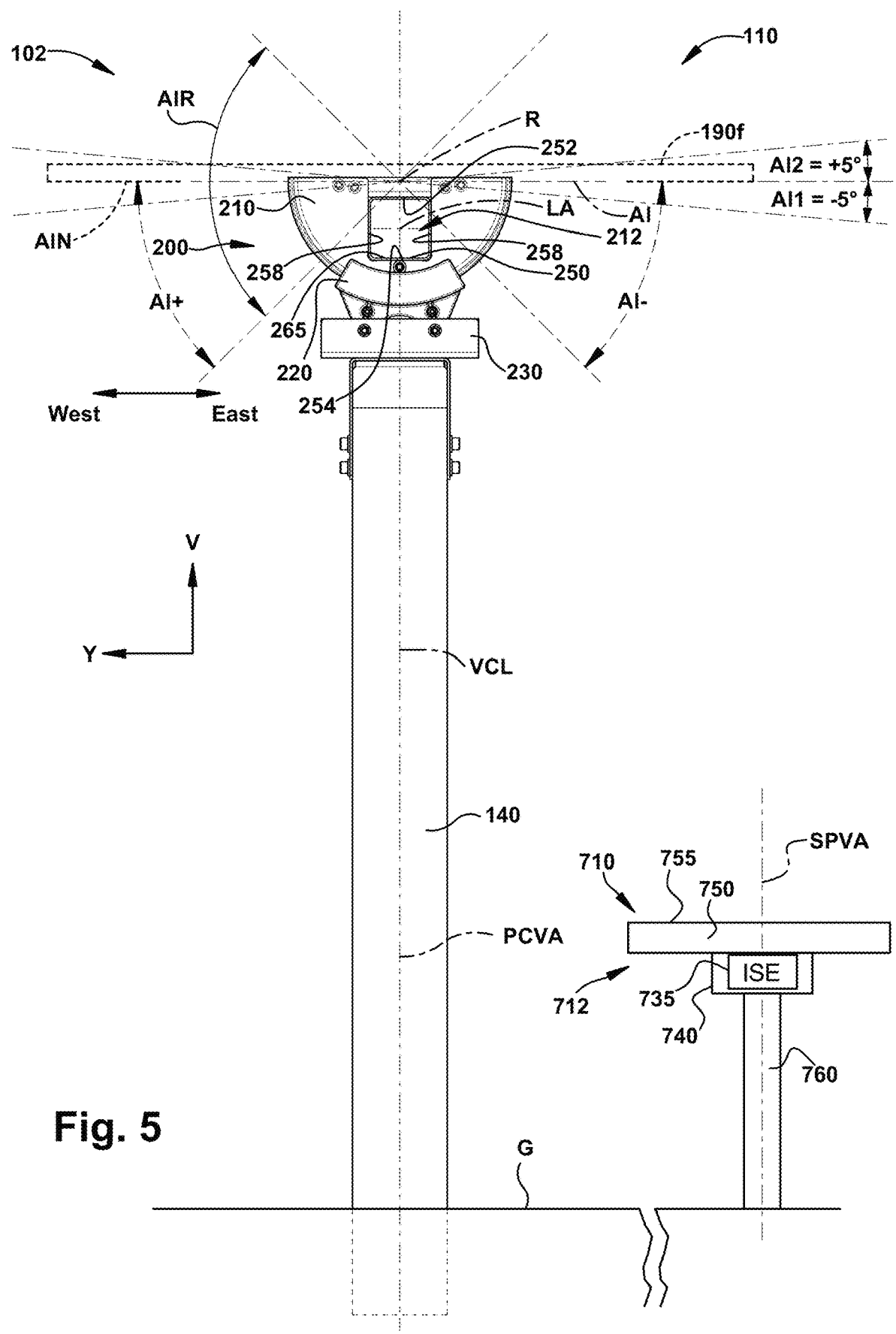
FIG. 5 is a is a schematic vertical section view of the representative solar tracker assembly of FIG. 2, as seen from a plane indicated by the line 5-5 in FIG. 4, schematically depicting the angle of inclination range of the table.

In one example or exemplary embodiment, the torque tube beam 250 comprises a hollow metal tube that is substantially square in cross section, having an open interior that is centered about a central longitudinal axis LA. In one exemplary embodiment, the torque tube beam 250 is approximately 100 mm. by 100 mm. (approximately 4 in. by 4 in.) and includes an upper wall 252 and the lower wall 254 spaced apart by parallel side walls 258. The torque tube beam 250 extends along the longitudinal axis LA of the torque tube beam 250 and, as noted above, extends generally parallel to the ground G (FIG. 5). Hence, as the ground is generally horizontal, the solar tracker assembly is referred to as a horizontal, single axis solar tracker assembly 100. The torque tube beam 250 is comprised of a number of connected torque tube beam segments, each of which is approximately 40 feet in length. In the schematic depiction of FIGS. 2-5, only a portion of the solar tracker assembly 100 and, thus, only a portion of the extent of the torque tube beam 250 and the frame 120 and a portion of the total number of bearing apparatuses of the plurality of bearing apparatuses 200 are shown. For example, in FIGS. 3 and 4, the first and second torque tube beam segments 260, 265 and portions of the third and fourth torque tube beam segments 270, 275 are schematically depicted. Of course, it should be appreciated that given that a torque tube beam segment is typically 40 feet in length and a typical photovoltaic module, such as the representative photovoltaic module 190a is approximately 1 meter by 2 meters and is mounted to the torque tube beam 250 in portrait orientation, many more photovoltaic modules would be present on any given torque tube beam segment than is schematically depicted in the FIGS. 2-4. Given that the plurality of photovoltaic modules 190 are typically supported in portrait orientation by the plurality of mounting brackets 130, a width W (FIG. 3) of the table 110 is typically 2 meters.

The plurality of bearing apparatuses 200 are positioned at spaced apart positions along the torque tube beam 250. Each bearing apparatus of the plurality of bearing apparatuses 200 includes the movable or rotatable bearing assembly 210 supporting the torque tube beam 250, a stationary saddle assembly 220, and a connecting assembly 230. The stationary saddle assembly constrains the pivoting or rotation of the rotatable bearing assembly 210 such that the bearing assembly 210 and the torque tube section extending through and supported by the rotatable bearing assembly 210 rotate about a bearing axis of rotation. The bearing axis of rotation defines a portion of the table axis of rotation R. The stationary saddle assembly 220 is mounted by the connecting assembly 230 to a support post 140, which is driven into the ground/substrate G or otherwise secured in the ground/substrate by, for example, concrete. Thus, the support post 140 and connecting assembly 230 determine the position and the vertical height of the rotatable bearing assembly 210 and, thereby, determine a height of the torque tube beam 250 with respect to the ground G. Each of the support posts 140 extend in the vertical direction V along a vertical center line or central vertical axis PCVA (FIG. 5) of the support post 140. For each of the support posts 140, a vertical center line VCL of the bearing assembly 200 is aligned with the center line of the support post 140 and is substantially parallel to the vertical axis SPVA of the post 760 of the irradiance sensor 710.

Each bearing apparatus of the plurality of bearing apparatuses 200, for example first and second bearing apparatuses 202, 204, includes the rotatable or rotating bearing assembly 210, the stationary saddle assembly 220 and the connecting assembly 230 (FIGS. 3 and 5). The torque tube beam 250 extends through and is supported by the rotatable bearing assembly 210 which rotates the torque tube beam 250 about the table axis of rotation R. The rotatable bearing assembly 210 of the bearing apparatus 200, in turn, is supported by the stationary saddle assembly 220. The stationary saddle assembly 220 constrains the pivoting or rotation of the rotatable bearing assembly 210 such that the bearing assembly and the torque tube section extending through and supported by the rotatable bearing assembly 210 rotate about a bearing axis of rotation. The table axis of rotation R (except in the region of the slew drive 160) is collectively defined by axes of rotation of the plurality of bearing apparatuses 200 positioned at spaced apart internals along the extent of the torque tube beam 250. Stated another way, each bearing axis of rotation of each bearing apparatus defines a portion of the overall table axis of rotation R. The individual axis of rotation of each of the plurality of solar tracker bearing apparatuses 200 are substantially aligned to or coincident to form a single or combined table axis of rotation R. As best seen in FIGS. 2 and 3, in the region of the slew drive 160, the table axis of rotation R is defined by: a) the axes of rotation of the first and second bearing apparatus 202, 204 of the plurality of bearing apparatuses 200; and b) the center of rotation of the rotating member 170 of the slew drive 160 and a pair of drive journals 300, namely, first and second drive journals 310, 350, which are affixed to opposite sides 172, 174 of the rotating member 170 and, in turn, receive end portions of the first and second torque tube beam segments 260, 265.

The representative solar tracker assembly 102 includes the drive mechanism 150 which, in one exemplary embodiment, includes the slew drive 160 having the stationary housing 162 supporting the rotating drive member 170. The drive mechanism 150 of the solar tracker assembly 102 operates under the control of the solar tracker controller 602 to pivot or rotate the table 110, including the plurality of photovoltaic modules 190, about the table axis of rotation R. Disposed within the stationary housing 162 is a gear train of the slew drive 160 which is operatively coupled to and drives the rotating drive member 170 about a drive mechanism axis of rotation. The drive mechanism 150 further includes a DC motor 180 coupled to the stationary housing 162 of the slew drive 160. In one exemplary embodiment, the DC motor 180 is a brushed 24 volt DC motor. An output shaft of the DC motor 180 is operatively connected to a gear train of the slew drive 160 such that rotation of the output shaft of the DC motor 180 rotates the slew drive gear train. The slew drive gear train, in turn, is operatively coupled to the rotating drive member 170 of the slew drive 160 such that actuation of the DC motor 180 and rotation of the DC motor output shaft causes a proportional and precise rotation of the rotating drive member 170 of the slew drive 160. This rotation of the slew drive rotating drive member 170, in turn, precisely rotates the table 110 of the solar tracker assembly 102 to a desired table angle of inclination AI. That is, rotation of the rotating drive member 170 of the slew drive 160 by the DC motor 180 causes a precise rotation of the table 110 of the solar tracker assembly 102 to a desired table angle of inclination AI (within, of course, the limits of the table angle of inclination range AIR).

Additional details regarding the structure and function of a horizontal, single axis solar tracker assembly are disclosed in U.S. Pat. No. 10,944,354 to Ballentine et al., issued Mar. 9, 2021 ("the '354 patent"), and U.S. Pat. No. 11,271,518 to Ballentine et al., issued Mar. 8, 2022 ("the '518 patent"), both of which are assigned to the assignee of the present application. Both the '354 patent and the '518 patent are incorporated by reference herein in their respective entireties.

In one example embodiment, the housing 610 of the solar tracker controller 602, enclosing electronics 620 of the controller, is mounted to a lower wall 254 of the torque tube beam 250 of the solar tracker assembly 102 and the solar tracker controller 602 is powered by the dedicated photovoltaic module 647, which is also mounted to the torque tube beam 250. The dedicated photovoltaic module 647 is mounted to the torque tube beam 250 such that it is aligned with the plurality of photovoltaic modules 190 and pivots with the plurality of photovoltaic modules 190 through the table angle of inclination AI. As best seen in FIGS. 2-5, the representative solar tracker assembly 102 includes the drive mechanism 150 to rotate a table 110 of the solar tracker assembly 100 about a table axis of rotation R through the predetermined angle of inclination range AIR. The table 110 of the solar tracker assembly 102 includes the frame 120 supporting a plurality of photovoltaic modules 190, including, as schematically depicted in FIG. 2, representative photovoltaic modules 190a, 190b, 190c, 190d, 190e, 190f. The rotatable torque tube beam 250 of the table 110, in turn, supports the frame 120. The plurality of bearing apparatuses 200, including representative bearing apparatuses 202, 204, in turn, rotatably support the torque tube beam 250. The torque tube beam 250 is comprised of a plurality of aligned and couple torque tube beam segments. In FIGS. 3 and 4, portions of four torque tube beam segments, namely, first, second, third and fourth torque tube beam segments 260, 265, 270, 275 of the torque tube beam 250 are schematically depicted, it being understood that the solar tracker assembly 100 includes additional torque tube beam segments not shown. The plurality of bearing apparatuses 200 are advantageously configured and positioned such that, other than the first and second torque tube beam segments 260, 265 of the torque tube beam 250 adjacent the drive mechanism 150, the table axis of rotation R, is vertically aligned with, that is, would pass through or be acceptably close, for design purposes, to passing through a center of gravity or center of mass of the table 110.

Each solar tracker assembly, e.g., representative solar tracker assemblies 102, 104, 106, 108, of the plurality of solar tracker assemblies 100 operates under the control of an associated, dedicated solar tracker controller of the plurality of solar tracker controllers 600, e.g., solar tracker controllers 602, 604, 606, 608. In one exemplary embodiment, the housing 610, containing electronics 620 of the solar tracker controller 602, is mounted to a torque tube beam 250 of its associated solar tracker assembly 102, as schematically depicted in FIG. 2. For example, a solar tracker controller 602 of the plurality of solar tracker controllers 600 is associated with and, via an actuator 630a of the solar tracker controller 602 which is operatively coupled to the drive mechanism 150 of the solar tracker assembly 102, controls the angle of inclination of a table 110 of the solar tracker assembly 102. Each of the solar tracker controllers of the plurality of solar tracker controllers 600 may be considered to be part of its associated solar tracker assembly of the plurality of solar tracker assemblies 100. For example, the solar tracker assembly 602 may be considered as a component of its associated solar tracker assembly 102. Additionally, each of the solar tracker controllers of the plurality of solar tracker controllers 600, for example, representative solar tracker controller 602, is also part of the solar tracker control and communications system 500.

In FIG. 5, the angle of inclination range AIR of the table 110 of the solar tracker assembly 102 is schematically depicted, along with maximum positive and negative table angles of inclination AI+, AI−. In FIG. 5, a representative photovoltaic module 190g of the solar tracker assembly 102 is shown in dashed line with a neutral angle of inclination AIN, which means the photovoltaic module 190g (and therefore, the table 110 of the solar tracker assembly 102) is horizontal, facing directly upward, for example, when the sun is at its apex in the sky. Also shown is dashed line in FIG. 5 is an angle of inclination AI1 (AM overcast sky condition angle of inclination). The AM overcast sky condition angle of inclination AI1 is a shallow eastward facing angle of inclination utilized during the overcast sky mode 1200 when the time is a solar AM time period (i.e., a solar AM time period is a daylight hour time up until "solar noon", that is, the moment when the sun is at its peak). In one example embodiment, AI1=−5 degrees facing eastward. Additionally shown is dashed line in FIG. 5 is an angle of inclination AI2 (PM overcast sky condition angle of inclination). The PM overcast sky condition angle of inclination AI2 is a shallow westward facing angle of inclination utilized during the overcast sky mode 1200 when the time is a solar PM time period (i.e., a solar PM time period is a daylight hour which is at or after the "solar noon", that is, the moment when the sun is at its peak). In one example embodiment, A12=+ 5 degrees facing westward.

Overcast Condition Method 2000

When the sky is overcast, the best result in terms of energy production from the plurality of photovoltaic modules 190 of the tables 110 of the set of solar tracker assemblies 109a affected by the overcast sky condition would be achieved by having the array controller 510 communicate control signal to the associated controllers 609a associated with the set of solar tracker assemblies 109a to move the tables 110 to a neutral angle of inclination, AI=0 degrees, and leave the tables at the neutral angle of inclination for the duration of the overcast sky condition. This approach both: a) increases energy output by the plurality of photovoltaic modules 190 of the solar tracker assemblies of the set of solar tracker assemblies 109a because the plurality of photovoltaic modules 190 essentially "see" the entirety of the sky, from horizon to horizon, and, thus, maximize the amount of diffuse sunlight received by the plurality of photovoltaic modules 190 of the solar tracker assemblies of the set of solar tracker assemblies 109a; and b) uses less energy because the tables 110 of the set of solar tracker assemblies 109a are stationary and the drive mechanisms 150 of the set of solar tracker assemblies 109a do not have to be energized by the batteries of the associated set of solar tracker controllers 609a, as would otherwise be the case in the normal tracking mode 1100. However, it has been found that utilizing a neutral angle of inclination AI=0 degrees is not ideal, if AI=0 degrees, the plurality of photovoltaic modules 190 may experience a flutter or oscillation effect as winds pass over the horizontal surfaces of the plurality of photovoltaic modules 190. Such flutter or oscillation is undesirable since it could potentially build in amplitude and result in damage to the plurality of photovoltaic modules 190 or other components of the set of solar tracker assemblies 109a. Advantageously, by changing the angle of inclination in the overcast sky mode 1200 to the shallow angle AI1=−5 degrees for the AM overcast sky condition angle of inclination and to the shallow angle AI2=+ 5 degrees for the PM overcast sky condition angle of inclination, the flutter effect is mitigated, while still retaining the advantage of increased energy output during overcast conditions by the plurality of photovoltaic modules 190 of the solar tracker assemblies of the set of solar tracker assemblies 109a because the plurality of photovoltaic modules 190 essentially "see" the entirety of the sky, from horizon to horizon, and, thus, maximize the amount of diffuse sunlight received by the plurality of photovoltaic modules 190. Furthermore, by having the AM overcast sky angle of inclination facing slightly eastward (AI1=−5 degrees), should the sun make intermittent appearances through the overcast sky condition, the AM angle is inclination AI1 is facing or angled, at least somewhat, in the direction of a morning sun position. Similarly, by having the PM overcast sky angle of inclination facing slightly westward (AI21=+ 5 degrees), should the sun make intermittent appearances through the overcast sky condition, the PM angle is inclination AI1 is facing or angled, at least somewhat, in the direction of an afternoon sun position.

Figure 6:
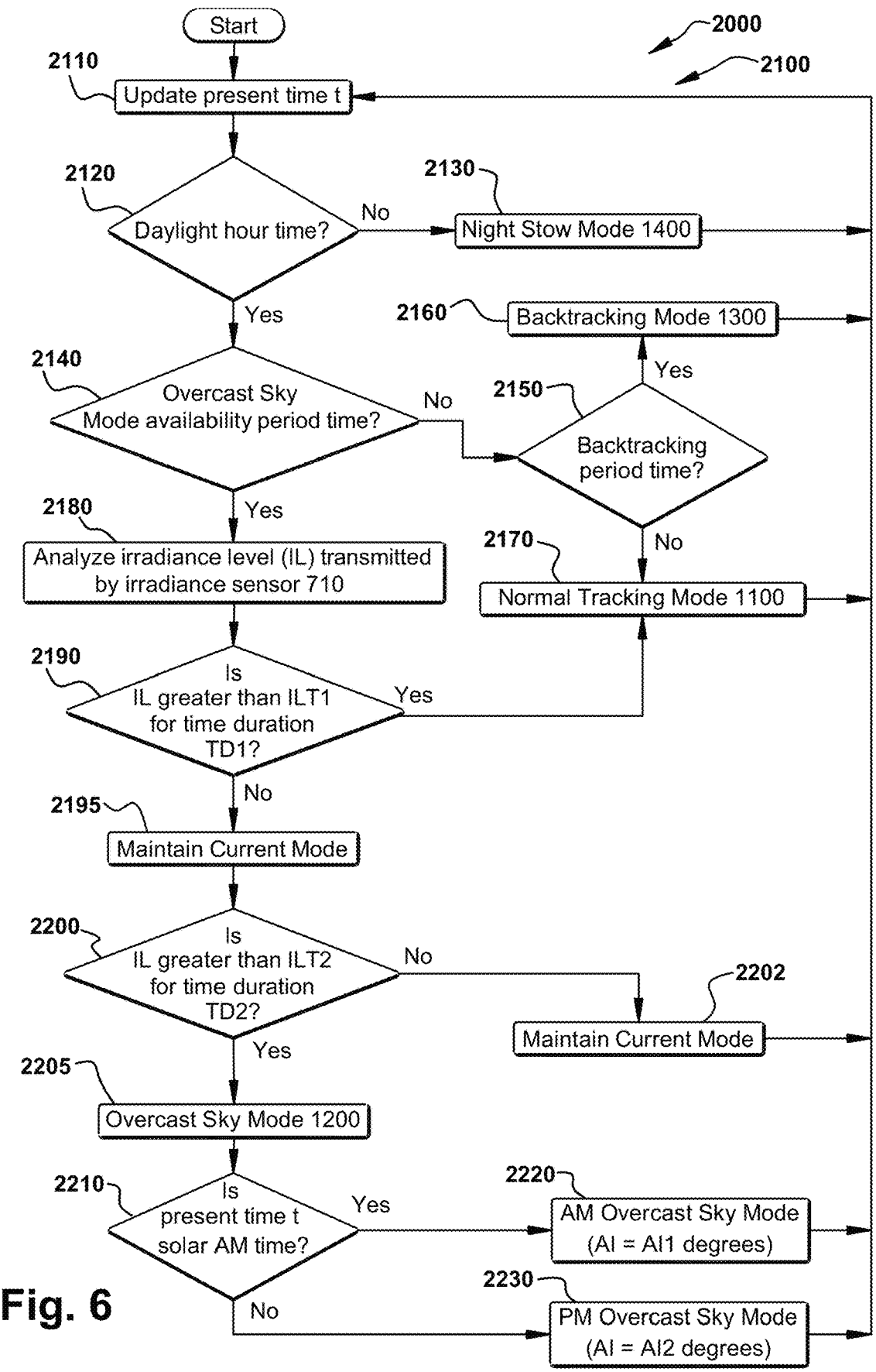
FIG. 6 is a simplified flow chart illustrating selected steps of a method or process of the present disclosure for determining and responding to an overcast sky condition utilizing the first solar irradiance sensor associated with the first set of solar tracker assemblies of the solar tracker installation the array controller of the control and communications system, and the set of solar tracker controllers associated with the first set of solar tracker assemblies, as schematically depicted in the solar tracker installation of FIG. 1.

A simplified flow chart depicting selected steps of the overcast sky condition method 2000 of the present disclosure is presented generally as a process or routine at 2100 in FIG. 6. The method of determining and responding to an overcast sky condition 2000 advantageously utilizes a single irradiance sensor 710 associated with the first set of solar tracker assemblies 109a and, in one exemplary embodiment, is executed or implemented by the array controller 510. The process 2100 includes the following steps. At step 2110, a running clock of the array controller 510 of the wireless communications and control system 500 provides an updated time of day t to the array controller 510. At step 2120, the array controller 510 determines if the present time t is a daylight hour time. If the determination at step 2120 is NO, then at step 2130, the array controller 510 goes to step 2130 and, since the present time t is a non-daylight hour time, either changes mode of the associated set of solar tracker assemblies 109a to the night stow mode 1400 or, if the current mode of the set of solar tracker assemblies 109a is the night stow mode 1400, maintains night stow mode for the associated set of solar tracker assemblies 109a. As the present time t is periodically updated by the array monitor 510, the process 2100 returns to step 2110 wherein the present time t is updated and the routine is repeated. If the determination at step 2120 is YES, then at step 2140, the array controller 510 determines if the present time t is an overcast sky mode 1200 availability time, that is, a time during daylight hours when the array controller 510 would be permitted to determine and respond if an overcast sky condition is determined to exist. If the determination at step 2140 is NO, then the array controller 510 goes to step 2150 and determines if the present time t is a backtracking time period, that is, a time during daylight hours when the array controller 510 would be permitted to go to a backtracking routine to mitigate row-to-row shading during periods subsequent to sunrise and prior to sunset.

If the determination is YES at step 2150, then the array controller 510 goes to step 2160 and either changes mode of the associated set of solar tracker assemblies 109a to the backtracking mode 1300 or, if the current mode of the set of solar tracker assemblies 109a is the backtracking mode 1300, maintains the backtracking mode 1300 for the set of solar tracker assemblies 109a. As the present time t is periodically updated by the array monitor 510, the process 2100 returns to step 2110 wherein the present time t is updated and the routine is repeated. If the determination is NO at step 2150, then, at step 2170, the array monitor 510 either changes mode of the associated set of solar tracker assemblies 109a to the normal tracking mode 1100 or, if the current mode of the set of solar tracker assemblies 109a is the normal tracking mode 1100, maintains the normal tracking mode 1100. As the present time t is periodically updated by the array monitor 510, the process 2100 returns to step 2110 wherein the present time t is updated and the routine is repeated. If the answer at step 2140 is YES (that is, the overcast sky mode 1200 is available), then at step 2180, the array controller 510 analyzes the most recent irradiance level (IL) transmitted by the irradiance sensor 710 to the array controller 510. At step 2190, the array controller 510 determines if the irradiance level IL is greater than a first predetermined threshold bright sky irradiance level value ILT1 for a duration equal to or greater than the first predetermined bright sky duration period TD1, indicative of a non-overcast (bright sun) sky condition for at least a period of time equal to or greater than the first bright sky duration period TD1. If the determination at step 2190 is YES, then the array controller 510 goes to step 2170 and either changes mode of the associated set of solar tracker assemblies 109a to the normal tracking mode 1100 or, if the current mode is the normal tracking mode 1100, maintains normal tracking mode for the set of solar tracker assemblies 109a. As the present time t is periodically updated by the array monitor 510, the process 2100 returns to step 2110 wherein the present time t is updated and the routine is repeated.

If the determination at step 2190 is NO, then the array controller 510 proceeds to step 2195 and maintains the current mode for the set of solar tracker assemblies 109a, i.e., maintains the status quo by keeping the current mode, whether it be the normal tracker mode 1100 or the overcast sky mode 1200. The process 2100 then moves to step 2200. At step 2200, the array controller 510 determines if the irradiance level IL is less than a second predetermined threshold overcast irradiance value ILT2 for at least a period of time equal to the second predetermined overcast sky duration or time period TD2, indicative of an overcast sky condition for at least a period of time equal to or greater than the second overcast sky duration period TD2. If the determination at step 2200 is NO, then the array controller 510 proceeds to step 2202 and maintains the current mode for the set of solar tracker assemblies 109a, i.e., maintains the status quo by keeping the current mode, whether it be the normal tracker mode 1100 or the overcast sky mode 1200. The process 2100 then moves to step 2110 wherein the present time t is updated and the process 2100 repeats. If the determination at step 2200 is YES, then the array controller 510 goes to step 2205 and either changes mode of the associated set of solar tracker assemblies 109a to the overcast sky mode 1200 or, if the current mode is the overcast sky mode 1200, maintains overcast sky mode 1200 for the set of solar tracker assemblies 109a. The process then goes to step 2210 and the array controller 510 determines if the present time t is within the solar AM time period (a daylight hour time up until "solar noon", when the sun is at its peak). If the determination at step 2210 is YES, then the array controller 510 goes to step 2220 and either changes mode of the associated set of solar tracker assemblies 109a to an AM angle of inclination value or AM mode of the overcast sky mode 1200 wherein table angle of inclination of the associated set of solar tracker assemblies 109a is set to AI=AI1=−5 degrees (tables angled slightly toward the east) or, if the current mode is the AM mode of the overcast sky mode 1200, maintains the AM angle of inclination value of the overcast sky mode 1200 for the set of solar tracker assemblies 109a by maintaining AI=AI1. If the determination at set 2200 is NO, then the array controller 510 goes to step 2230 and either changes mode of the associated set of solar tracker assemblies 109a to a PM angle of inclination value or PM mode of the overcast sky mode 1200 wherein, table angle of inclination of the associated set of solar tracker assemblies 109a is set to AI=AI2=+5 degrees (tables angled slightly toward the west) or, if the current mode is the PM mode of the overcast sky mode 1200, maintains PM angle of inclination value of the overcast sky mode 1200 for the set of solar tracker assemblies 109a by maintaining AI=AI2. The AM and PM overcast sky mode table angles of inclination AI1 and AI2 of the first set of solar tracker assemblies 109a may be considered as one or more predetermined overcast sky condition table angles of inclination. As the present time t is periodically updated by the array monitor 510, the process 2100 returns to step 2110 wherein the present time t is updated and the routine is repeated, as set forth above.

In one exemplary or example embodiment, the following values may be used in the overcast condition method 2000 and process 2100 of the present disclosure. Frequency f of irradiance level IL measurements by the irradiance sensor 710 and transmission to the array monitor 510–f=one measurement per minute. Dimension of irradiance level IL measurement value–$mW/cm^2$. First predetermined threshold bright sky irradiance level value ILT1, indicative of a non-overcast (bright sun) sky condition–ILT1=15 $mW/cm^2$. Second predetermined threshold overcast irradiance level value ILT2, indicative of overcast sky condition–ILT2=10 $mW/cm^2$. Daylight hour time period during which overcast sky mode 1200 is available–P=60 minutes after sunrise to 60 minutes prior to sunset.

Figure 6A:
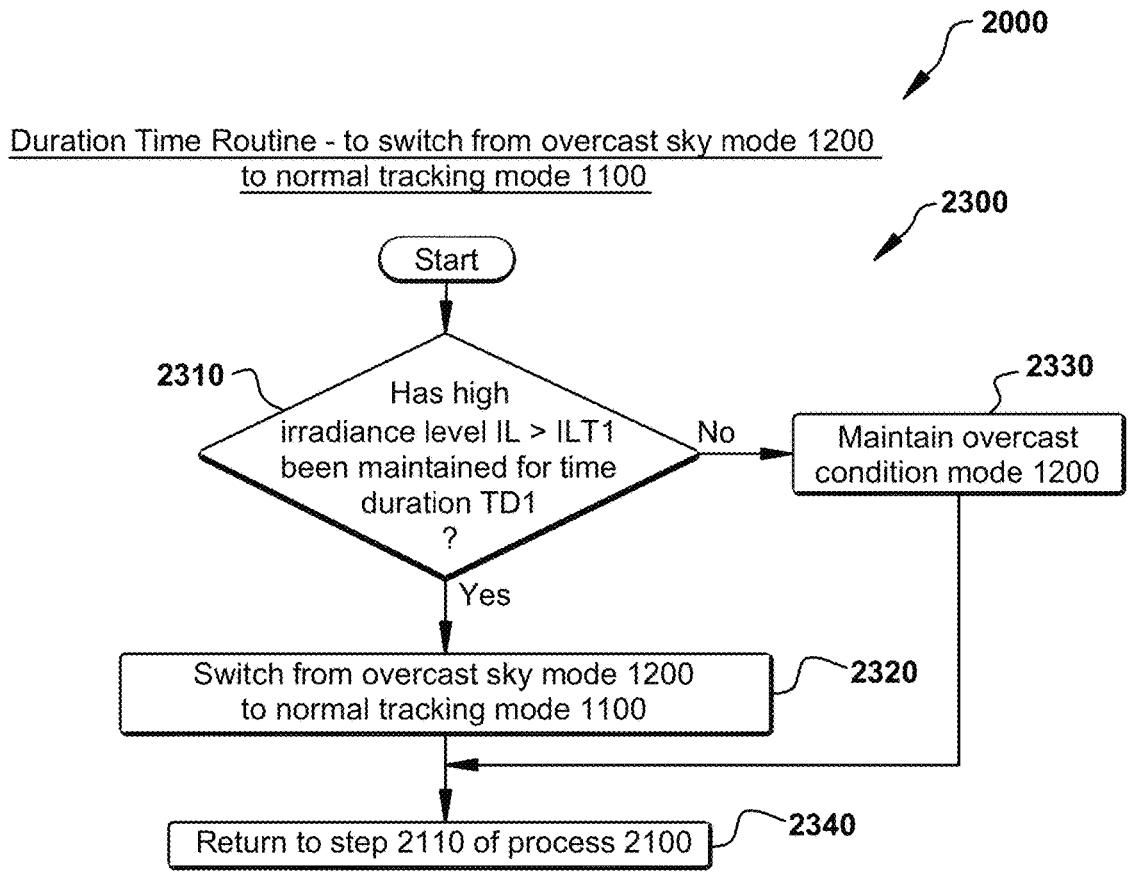
FIG. 6A is a simplified flow chart illustrating selected steps of a method or process of the present disclosure.
Figure 6A:
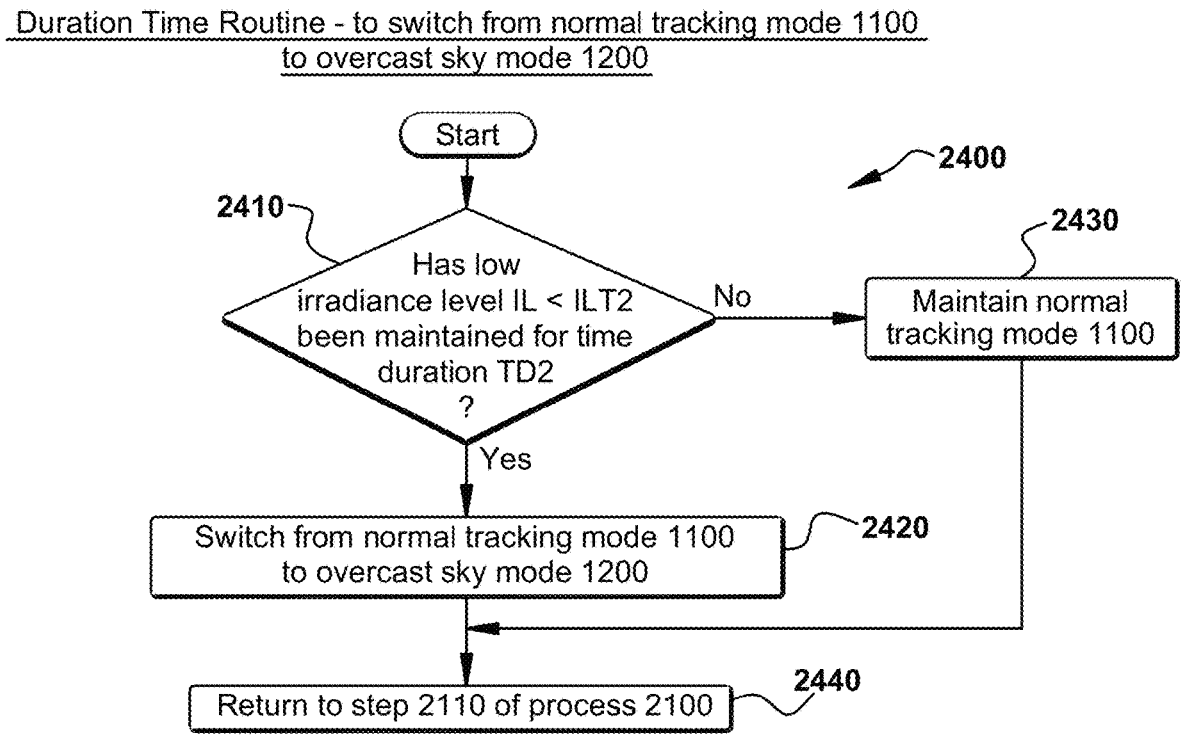

Under partly cloudy/partly sunny sky conditions, it may be the case that the array monitor 510 would be sending control signals to the set of solar tracker controllers 609a to switch between normal tracking mode 1100 and overcast sky mode 1200 every few minutes, as clouds pass and the sun breaks through the clouds. Indeed, under rapidly changing partly cloudy sky conditions, the switch between normal tracking mode 1100 and overcast sky mode 1200 could theoretically occur every one minute interval. This hypersensitivity or short duration shifting between the two modes 1100, 1200 is undesirable for a number of reasons including energy consumption, premature wearing out of drive mechanism components, etc. In order to avoid repeated short duration switches between normal tracking mode 1100 and overcast sky mode 1200, the process 2100 includes the following two additional minimum duration time routines or decision rules 2300, 2400, which are schematically depicted in FIG. 6A. The first duration time routine 2300 is utilized to determine if and when a switch from overcast sky mode 1200 to normal tracking mode 1100 should be made, if the irradiance level IL is greater than the first predetermined bright sky irradiance level value ILT1, indicative of a non-overcast (bright sun) sky condition. At step 2310, in order to switch from the overcast sky mode 1200 to the normal tracking mode 1100, the array monitor 510 must determine if a series of high irradiance levels (a series of irradiance levels $IL_1, IL_2, IL_3, IL_4, IL_5, \ldots$ each above ILT1) has been maintained for the first predetermined bright sky duration period TD1. If the answer at step 2310 is YES, then the array controller 510, at step 2320, transmits control signals to the first set of solar tracker controllers 109a to change the table angles of inclination AI for the first set of solar tracker assemblies 109a from the overcast sky mode 1200 to the normal tracking mode 1100. If the answer at step 2310 is NO, then the array controller 510, at step 2330, maintains the first set of solar tracker assemblies 1200 in the overcast sky mode 1200. Under either condition, the routine 2300, at step 2340, then returns to the process 2100 at step 2110 (FIG. 6) and updates the present time t. In one exemplary embodiment, the first predetermined bright sky duration period TD1 is five minutes. Stated another way, the array controller 510 analyzes the irradiance level data IL transmitted by the irradiance sensor 710 and, if the first set of solar tracker assemblies 109a are in the overcast sky mode 1200 and further if the series of irradiance level values $IL_1$, $IL_2$, $IL_3$, $IL_4$, $IL_5$, . . . are each above the threshold bright sky irradiance level value ILT1 for a duration of the first predetermined bright sky time or duration period TD1, then the array controller 510 transmits control signals to each of the first set of solar tracker controllers 609a to change the first set of solar tracker assemblies 109a from the overcast sky mode 1200 to the normal sun or solar tracking mode 1100 by pivoting respective tables of the first set of solar tracker assemblies 109a to calculated desired angles of inclination based on a sun position algorithm. Details regarding calculation of desired angles of inclination are found in the aforementioned U.S. non-provisional patent application Ser. No. 17/746,322, filed May 17, 2022, and assigned to the assignee of the present application. The present application is a continuation-in-part of application Ser. No. 17/746,322. Application Ser. No. 17/746,322 is incorporated by reference it its entirety herein.

When the first set of solar tracker assemblies 109a are in the normal tracking mode 1100, if the array monitor 510 determines, based on inputs from the plurality of weather sensors 700, that one or more adverse weather conditions are present (high wind condition, snow condition on the upper surfaces of the plurality of photovoltaic modules, etc.) that requires immediate response, the array controller 510 will issue appropriate control signals to the first set of solar tracker controllers 609a to interrupt the normal tracking mode 1100 and execute the appropriate remedial measures, e.g., move the tables 110 of the set of solar tracker assemblies 109a to a wind stow position or execute a table pivot in accord with a snow dump routine.

The second duration time routine 2400 is utilized to determine if and when a switch from normal tracking mode 1100 to overcast sky mode 1200 should be made, if the irradiance level IL is less than the second predetermined threshold overcast irradiance level value ILT2, indicative of an overcast sky condition. At step 2410, in order to switch from the normal tracking mode 1100 to the overcast sky mode 1200, the array monitor 510 must determine if a series of low irradiance levels (a series of irradiance levels $IL_1$, $IL_2$, $IL_3$, $IL_4$, $IL_5$, . . . each below ILT2) has been maintained for the second predetermined overcast sky duration time period TD2. If the answer at step 2410 is YES, then the array controller 510, at step 2420, transmits control signals to the first set of solar tracker controllers 109a to change the table angles of inclination AI for the first set of solar tracker assemblies 109a from the normal tracking mode 1100 to the overcast sky mode 1200. If the answer at step 2410 is NO, then the array controller 510, at step 2430, maintains the first set of solar tracker assemblies 1200 in the normal tracking mode 1100. Under either condition, the routine 2400, at step 2440, then returns to the process 2100 at step 2110 (FIG. 6) and updates the present time t. In one exemplary embodiment, the second predetermined overcast sky time period or duration period TD2 is 20 minutes. Stated another way, the array controller 510 analyzes the irradiance level data IL transmitted by the irradiance sensor 710 and, if the first set of solar tracker assemblies 109a are in the normal solar tracking mode 1100 and further if the series of irradiance level values $IL_1$, $IL_2$, $IL_3$, $IL_4$, $IL_5$, . . . are each below the threshold overcast irradiance level value ILT2 for a duration of the second predetermined overcast sky duration period TD2, then the array controller 510 transmits control signals to each of the first set of solar tracker controllers 609a to change the first set of solar tracker assemblies 109a from the normal solar tracking mode 1100 to the overcast sky mode 1200 by pivoting respective tables of the first set of solar tracker assemblies 109a to one or more predetermined overcast sky condition angles of inclination, namely, to AI=AI1, if the time is solar AM time, and to AI=AI2, if the time is solar PM time.

When the first set of solar tracker assemblies 109a are in the overcast sky mode 1200, if the array monitor 510 determines, based on inputs from the plurality of weather sensors 700, that one or more adverse weather conditions are present (high wind condition, snow condition on the upper surfaces of the plurality of photovoltaic modules, etc.) that requires immediate response, the array controller 510 will issue appropriate control signals to the first set of solar tracker controllers 609a to interrupt the overcast sky mode 1200 and execute the appropriate remedial measures, e.g., move the tables 110 of the set of solar tracker assemblies 109a to a wind stow position or execute a table pivot in accord with a snow dump routine.

As used herein, terms of orientation and/or direction such as upward, downward, forward, rearward, upper, lower, inward, outward, inwardly, outwardly, horizontal, horizontally, vertical, vertically, distal, proximal, axially, radially, east, west, north, south, etc., are provided for convenience purposes and relate generally to the orientation shown in the Figures and/or discussed in the Detailed Description. Such orientation/direction terms are not intended to limit the scope of the present disclosure, this application and the invention or inventions described therein, or the claims appended hereto.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A method of determining and responding to sky conditions during daylight hours in a solar tracker installation, the solar tracker installation located on an installation site and including a first set of solar tracker assemblies, each of the first set of solar tracker assemblies including a table supporting a plurality of photovoltaic modules, the table being rotatable through an angle of inclination range, and a drive mechanism coupled to the table for changing a table angle of inclination and a first set of solar tracker controllers, each solar tracker controller associated with a respective different one of the first set of solar tracker assemblies, each solar tracker controller of the first set of solar tracker controllers including an actuator for changing the table angle of inclination of the associated solar tracker assembly by actuating the drive mechanism of the associated solar tracker assembly of the first set of solar tracker assemblies, the steps of the method comprising:

a) one or more irradiance sensors located on the installation site periodically transmitting irradiance level data;

b) analyzing the irradiance level data transmitted by the one or more irradiance sensors; and c) if the first set of solar tracker assemblies are in a first tracking mode and further if a series of irradiance level values transmitted are below a threshold overcast irradiance level value for a predetermined overcast sky duration period or if a series of irradiance level values transmitted are above a threshold bright sky irradiance level value for a predetermined bright sky duration period, transmitting control signals to each of the first set of solar tracker controllers to change from the first tracking mode to a second tracking mode by pivoting respective tables of the first set of solar tracker assemblies.

2. The method of claim 1 wherein, if the series of irradiance level values transmitted are below the threshold overcast irradiance level value for the predetermined overcast sky duration period, transmitting control signals to each of the first set of solar tracker controllers to change from the first tracking mode to the second tracking mode, the first tracking mode being a normal solar tracking mode and the second tracking mode being an overcast sky mode.

3. The method of claim 1 wherein, if the series of irradiance level values transmitted are above the threshold bright sky irradiance level value for a predetermined bright sky duration period, transmitting control signals to each of the first set of solar tracker controllers to change from the first tracking mode to a second tracking mode, the first tracking mode being an overcast sky mode and the second tracking mode being a normal solar tracking mode.

4. A method of determining and responding to sky conditions in a solar tracker installation, the solar tracker installation located on an installation site and including a first set of solar tracker assemblies, each of the first set of solar tracker assemblies including a table supporting a plurality of photovoltaic modules, the table being rotatable through an angle of inclination range, and a drive mechanism coupled to the table for changing a table angle of inclination and a first set of solar tracker controllers, each solar tracker controller associated with a respective different one of the first set of solar tracker assemblies, each solar tracker controller of the first set of solar tracker controllers including an actuator for changing the table angle of inclination of the associated solar tracker assembly by actuating the drive mechanism of the associated solar tracker assembly of the first set of solar tracker assemblies, the steps of the method comprising:
  a) one or more irradiance sensors located on the installation site periodically transmitting irradiance level data;
  b) analyzing the irradiance level data transmitted by the one or more irradiance sensors; and
  c) if the first set of solar tracker assemblies are in a first tracking mode and further if a series of irradiance level values transmitted are below a first threshold level value for a predetermined period, transmitting control signals to each of the first set of solar tracker controllers to change from the first tracking mode to a second tracking mode by pivoting respective tables of the first set of solar tracker assemblies.

5. The method of claim 4 wherein the first tracking mode is a normal solar tracking mode and the second tracking modes is an overcast sky mode and further the first threshold level value is a threshold overcast irradiance level value and the predetermined time period is a predetermined overcast sky duration period.

6. The method of claim 5 further including the step of transmitting control signals to each of the first set of solar tracker controllers to change from the normal solar tracking mode to the overcast sky mode.

7. A method of determining and responding to sky conditions in a solar tracker installation, the solar tracker installation located on an installation site and including a first set of solar tracker assemblies, each of the first set of solar tracker assemblies including a table supporting a plurality of photovoltaic modules, the table being rotatable through an angle of inclination range, and a drive mechanism coupled to the table for changing a table angle of inclination and a first set of solar tracker controllers, each solar tracker controller associated with a respective different one of the first set of solar tracker assemblies, each solar tracker controller of the first set of solar tracker controllers including an actuator for changing the table angle of inclination of the associated solar tracker assembly by actuating the drive mechanism of the associated solar tracker assembly of the first set of solar tracker assemblies, the steps of the method comprising:
  a) one or more irradiance sensors located on the installation site periodically transmitting irradiance level data;
  b) analyzing the irradiance level data transmitted by the one or more irradiance sensors; and
  c) if the first set of solar tracker assemblies are in a first tracking mode and further if a series of irradiance level values transmitted are above a first threshold level value for a predetermined period, transmitting control signals to each of the first set of solar tracker controllers to change from the first tracking mode to a second tracking mode by pivoting respective tables of the first set of solar tracker assemblies.

8. The method of claim 7 wherein the first tracking mode is an overcast sky mode and the second tracking mode is a normal solar tracking mode and further the first threshold level value is a threshold bright sky irradiance level value and the predetermined time period is a predetermined bright sky duration period.

9. The method of claim 8 further including the step of transmitting control signals to each of the first set of solar tracker controllers to change from the overcast sky mode to the normal solar tracking mode.

* * * * *